US012764827B2

(12) United States Patent
Dimou et al.

(10) Patent No.: US 12,764,827 B2

(45) Date of Patent: Oct. 13, 2026

(54) UE TIMERS DURING CELL DISCONTINUOUS TRANSMISSION

(71) Applicant: QUALCOMM Incorporated, San Diego, CA (US)

(72) Inventors: Konstantinos Dimou, New York, NY (US); Yan Zhou, San Diego, CA (US); Jianghong Luo, Skillman, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 18/156,592

(22) Filed: Jan. 19, 2023

(65) Prior Publication Data

US 2024/0251472 A1 Jul. 25, 2024

(51) Int. Cl.
*H04W 76/28* (2018.01)
*H04W 24/08* (2009.01)

(52) U.S. Cl.
CPC ........... *H04W 76/28* (2018.01); *H04W 24/08* (2013.01)

(58) Field of Classification Search
None
See application file for complete search history.

(56) References Cited

U.S. PATENT DOCUMENTS

| | | | | |
|---|---|---|---|---|
| 10,194,438 | B2 | 1/2019 | Ramaswamy et al. | |
| 2021/0352757 | A1* | 11/2021 | He | H04W 72/21 |
| 2024/0023195 | A1* | 1/2024 | Kim | H04W 76/28 |

OTHER PUBLICATIONS

International Search Report and Written Opinion—PCT/US2023/083366—ISA/EPO—Apr. 19, 2024.

Moderator(Intel Corporation): "Discussion Summary #4 for Energy Saving Techniques of NW Energy Saving SI", 3GPP TSG RAN WG1 Meeting #111, R1-2212780, Type_Discussion, FS_Netw_Energy_NR, 3rd Generation Partnership Project (3GPP), Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 21, 2022, 219 Pages, XP052223324, proposal 6, p. 63, p. 70, paragraph 6.1.x.3.

* cited by examiner

*Primary Examiner* — Suhail Khan

(74) *Attorney, Agent, or Firm* — Holland & Hart LLP

(57) ABSTRACT

Methods, systems, and devices for wireless communications are described. The techniques described herein relate to equipment (UE) timers during cell discontinuous transmission (DTX) and/or discontinuous reception (DRX) at a network entity. A UE may receive control signaling indicating a timer configuration for operation of a timer at the UE associated with a DTX and/or DRX pattern at the network entity. The control signaling may indicate that the network entity will operate in accordance with the DTX and/or DRX pattern for a period of time. The DTX and/or DRX pattern indicates that the network entity cycles between an active transmission/reception mode and an inactive transmission/reception mode during the period of time. The UE may communicate a transmission with the network entity that initiates the timer. The UE operates the timer during the period of time based on the timer configuration.

20 Claims, 14 Drawing Sheets

UE TIMERS DURING CELL DISCONTINUOUS TRANSMISSION

FIELD OF TECHNOLOGY

The following relates to wireless communications, including user equipment timers during cell discontinuous transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support user equipment (UE) timers during cell discontinuous transmission (DTX). A network entity (e.g., a cell) may indicate to a UE that the network entity will operate in accordance with a DTX pattern for period of time. The network entity may also indicate to the UE a configuration for a UE timer while the network entity operates in the DTX pattern. Accordingly, the UE may execute the timer in a manner compatible with the DTX pattern, such that the UE may communicate a transmission associated with the timer with the network entity upon expiration of the timer.

A method for wireless communications at a UE is described. The method may include receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the network entity, a transmission that initiates the timer, and operating the timer during the period of time in accordance with the timer configuration.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the network entity, a transmission that initiates the timer, and operate the timer during the period of time in accordance with the timer configuration.

Another apparatus for wireless communications at a UE is described. The apparatus may include means for receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, means for communicating, with the network entity, a transmission that initiates the timer, and means for operating the timer during the period of time in accordance with the timer configuration.

A non-transitory computer-readable medium storing code for wireless communications at a UE is described. The code may include instructions executable by a processor to receive, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the network entity, a transmission that initiates the timer, and operate the timer during the period of time in accordance with the timer configuration.

In some examples of the method, apparatuses, and non-transitory computer-readable medium described herein, receiving the control signaling may include operations, features, means, or instructions for receiving a first control message indicating the timer configuration and receiving a second control message indicating that the network entity will operate in accordance with the DTX pattern for the period of time.

In some examples of the method, apparatuses, and non-transitory computer-readable medium described herein, operating the timer in accordance with the timer configuration may include operations, features, means, or instructions for stopping the timer based on the network entity entering the inactive transmission mode in accordance with the DTX pattern and resetting the timer based on the network entity entering the active transmission mode in accordance with the DTX pattern.

In some examples of the method, apparatuses, and non-transitory computer-readable medium described herein, operating the timer in accordance with the timer configuration may include operations, features, means, or instructions for pausing the timer based on the network entity entering the inactive transmission mode in accordance with the DTX pattern and resuming the timer based on the network entity entering the active transmission mode in accordance with the DTX pattern.

In some examples of the method, apparatuses, and non-transitory computer-readable medium described herein, operating the timer in accordance with the timer configuration may include operations, features, means, or instructions for operating the timer using a second value for the timer different than a first value for the timer associated with the active transmission mode, the second value indicated in the timer configuration.

In some examples of the method, apparatuses, and non-transitory computer-readable medium described herein, operating the timer in accordance with the timer configuration may include operations, features, means, or instructions for implementing the timer configuration based on the network entity being in the inactive transmission mode for at least a threshold duration of a timer duration of the timer.

In some examples of the method, apparatuses, and non-transitory computer-readable medium described herein, communicating, with the network entity, a second transmission that initiates a second timer and running the second timer in accordance with the timer configuration.

In some examples of the method, apparatuses, and non-transitory computer-readable medium described herein, the timer configuration indicates a first configuration for the timer and a second configuration for the second timer.

Some examples of the method, apparatuses, and non-transitory computer-readable medium described herein may further include operations, features, means, or instructions for communicating a second transmission with the network entity based on an expiration of the timer in accordance with the timer configuration.

A method for wireless communications at a network entity is described. The method may include transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the UE, a transmission that initiates a timer at the UE, and monitoring for a transmission from the UE during the period of time based on the timer configuration.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the UE, a transmission that initiates a timer at the UE, and monitor for a transmission from the UE during the period of time based on the timer configuration.

Another apparatus for wireless communications at a network entity is described. The apparatus may include means for transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, means for communicating, with the UE, a transmission that initiates a timer at the UE, and means for monitoring for a transmission from the UE during the period of time based on the timer configuration.

A non-transitory computer-readable medium storing code for wireless communications at a network entity is described. The code may include instructions executable by a processor to transmit, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time, communicating, with the UE, a transmission that initiates a timer at the UE, and monitor for a transmission from the UE during the period of time based on the timer configuration.

Some examples of the method, apparatuses, and non-transitory computer-readable medium described herein may further include operations, features, means, or instructions for transmitting, to a second network entity, second control signaling indicating the timer configuration.

In some examples of the method, apparatuses, and non-transitory computer-readable medium described herein, transmitting the control signaling may include operations, features, means, or instructions for transmitting a first control message indicating the timer configuration and transmitting a second control message indicating that the network entity will operate in accordance with the DTX pattern for the period of time.

In some examples of the method, apparatuses, and non-transitory computer-readable medium described herein, transmitting the control signaling may include operations, features, means, or instructions for transmitting the control signaling indicating the timer configuration indicating for the UE to stop the timer based on the network entity entering the inactive transmission mode in accordance with the DTX pattern and for the UE to reset the timer based on the network entity entering the active transmission mode in accordance with the DTX pattern.

In some examples of the method, apparatuses, and non-transitory computer-readable medium described herein, transmitting the control signaling may include operations, features, means, or instructions for transmitting the control signaling indicating the timer configuration indicating for the UE to pause the timer based on the network entity entering the inactive transmission mode in accordance with the DTX pattern and for the UE to resume the timer based on the network entity entering the active transmission mode in accordance with the DTX pattern.

In some examples of the method, apparatuses, and non-transitory computer-readable medium described herein, transmitting the control signaling may include operations, features, means, or instructions for transmitting the control signaling indicating the timer configuration indicating for the UE to use a second value for the timer different than a first value for the timer associated with the active transmission mode of the network entity, the second value indicated in the timer configuration.

In some examples of the method, apparatuses, and non-transitory computer-readable medium described herein, operating the timer in accordance with the timer configuration may include operations, features, means, or instructions for transmitting the control signaling indicating the timer configuration indicating for the UE to implement the timer configuration based on the network entity being in the inactive transmission mode for at least a threshold duration of a timer duration of the timer.

In some examples of the method, apparatuses, and non-transitory computer-readable medium described herein, communicating, with the UE, a transmission that initiates a second timer at the UE in accordance with the timer configuration, where monitoring for the transmission includes monitoring for the transmission based on the timer, the second timer, and the timer configuration.

In some examples of the method, apparatuses, and non-transitory computer-readable medium described herein, the timer configuration indicates a first configuration for the timer and a second configuration for the second timer.

DETAILED DESCRIPTION

Figure 1:
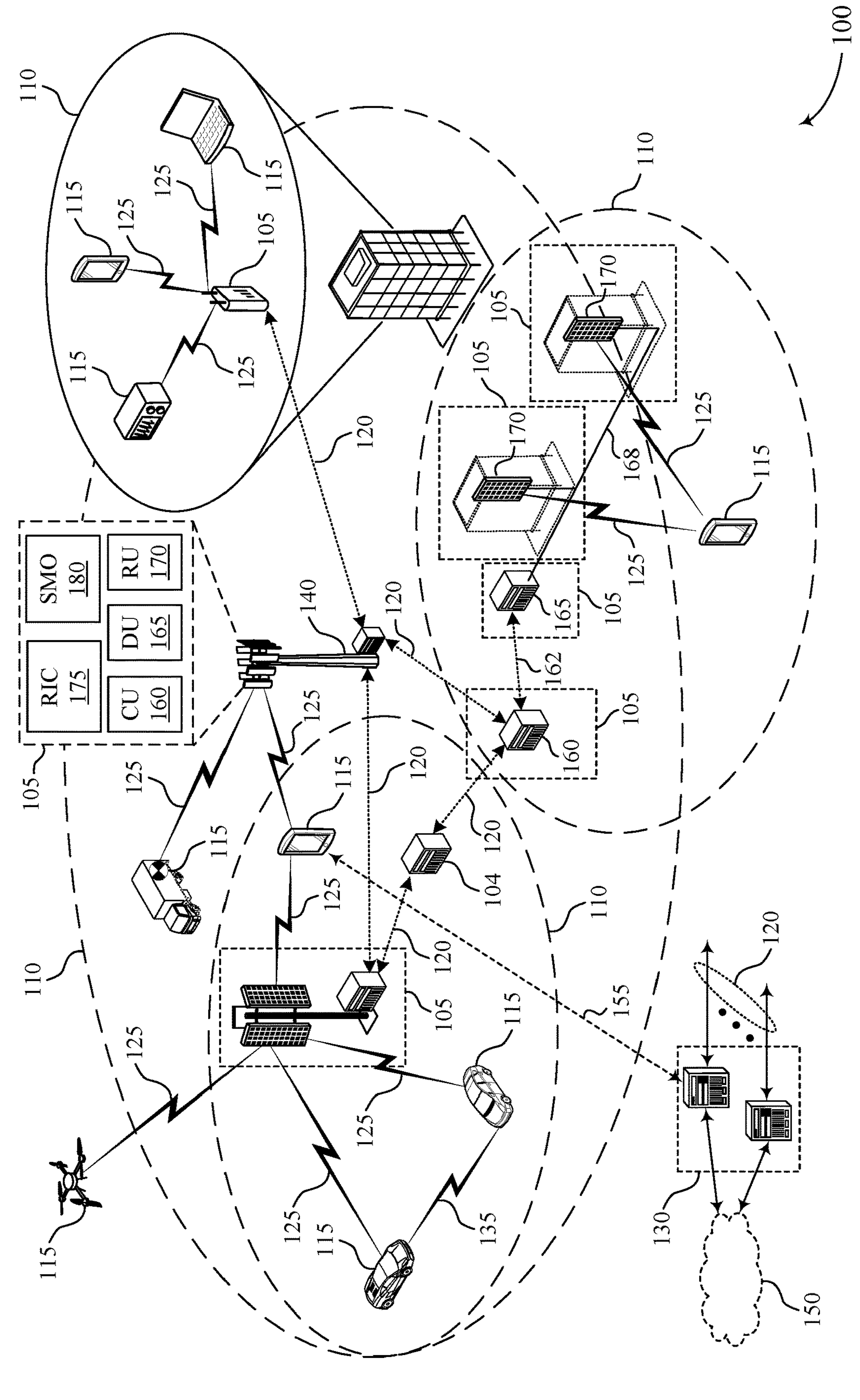
FIG. 1 illustrates an example of a wireless communications system that supports user equipment (UE) timers during cell discontinuous transmission (DTX) in accordance with one or more aspects of the present disclosure.

In some wireless communications systems, a network entity (e.g., a cell) may enter an inactive mode or a sleep mode, for example, to save power. In particular, a network entity may enter a discontinuous transmission (DTX) mode, in which the network entity may pause the transmission for some channels or for some signals. A user equipment (UE) may be configured via radio resource control (RRC) signaling with one or more timers, which may start based on communication of respective transmissions between the UE and the network. When a timer expires, the UE may perform a configured action. For example, a timer to begin upon transmission of an initial access by the UE, and upon expiration, the UE may transmit a new initial access message or may perform a cell reselection procedure. If the network entity is in an inactive state in accordance with the DTX mode, the network entity may be unable to respond to a communication transmitted by the UE in response to a timer expiring at the UE.

A network entity may indicate to a UE that the network entity will operate in accordance with a DTX pattern for a period of time and a configuration for a UE timer while the network entity operates in the DTX pattern. Accordingly, the UE may execute the timer in a compatible manner with the DTX pattern, such that the UE may communicate a transmission associated with the timer with the network entity upon expiration of the timer. In accordance with supporting UE timers during cell DTX, such as by using timer configurations as discussed in more detail throughout the application, expiration of UE timers may be prevented so that the network is able to timely respond to a request from the UE. In particular, the UE may receive, from the network entity, control signaling indicating a timer configuration for operating a timer at the UE associated with a DTX pattern at the network entity. The timer configuration provides one or more configurations to facilitate extending the duration of the timer to prevent expiration. The control signaling indicates that the network entity may operate in accordance with the discontinuous pattern for the period of time, where the discontinuous transmission pattern indicates that the network entity cycles between an active transmission mode and inactive transmission mode during the period of time. That is, the timer configuration is based on the discontinuous transmission pattern indicated in the control signaling. In this manner, the timer configuration may provide configuration that considers the pattern of the active transmission mode and inactive transmission mode so a timer that has been initiated does not expire before the network can respond to a request from the UE when the network entity enters or reenters active transmission mode. The UE operates the timer in accordance with the timer configuration. In this manner, UE timers may not expire before the network responds to the UEs, and the network may not simultaneously serve all UEs with pending timers when the network entity reenters the active transmission mode (e.g., network entity awakens).

In some examples, the network may indicate the timer configuration in an RRC message. In such examples, upon an indication that the network entity is entering a DTX pattern, the UE may operate the timer in accordance with the timer configuration. In some examples, the network entity may indicate that the network entity will operate in accordance with a DTX pattern in a dynamic message, for example, as a downlink control information (DCI) or a medium access control (MAC) control element (MAC-CE). In some cases, the control message that indicates that the network will operate in accordance with a DTX pattern, may also indicate the timer configuration. The network entity may indicate configurations to apply to multiple timers for the UE while the network entity operates in accordance with a DTX pattern.

In some examples, the timer configuration may include stopping the timer based on the network entity entering an inactive transmission mode and resetting the timer (e.g., setting the timer value back to the initial value) based on the network entity entering an active transmission. In some examples, the timer configuration may include pausing the timer based on the network entity entering an inactive transmission mode and resuming the timer based on the network entity entering an active transmission mode. In some examples, the timer configuration may include executing or running the timer using a second value for the timer different than a first value for the timer associated with normal operation of the network entity. In some examples, implementing the timer configuration may be based on the network entity being in an inactive transmission mode for a threshold duration of a timer duration of the timer. Implementing one or more of the timer configurations discussed herein may facilitate with preventing a timer expiration. For example, stopping the timer based on the inactive transmission mode and resetting the timer based on the active transmission mode, as well as pausing the timer during the inactive transmission mode and resuming the timer during the active transmission mode, may prevent the timer from expiring by effectively extending the timer duration. As another example, running the timer using the second value for the timer different than the first value for the timer associated with normal operation of the network entity, may prevent the timer from expiring. Implementing the timer configuration based on the inactive transmission mode for a threshold duration of the timer duration, may also prevent the timer from expiring.

Aspects of the disclosure are initially described in the context of wireless communications systems. Aspects of the disclosure are further illustrated by and described with reference to apparatus diagrams, system diagrams, and flowcharts that relate to UE timers during cell discontinuous DTX. Although the disclosure discussed herein is primarily described with respect to DTX, the disclosure may additionally or alternatively apply to discontinuous reception (DRX) and a DRX pattern.

FIG. 1 illustrates an example of a wireless communications system 100 that supports UE timers during cell DTX in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (MC) 175 (e.g., a Near-Real Time MC (Near-RT RIC), a Non-Real Time MC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support UE timers during cell DTX as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta_f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 may indicate to a UE 115 that the timer will operate in accordance with a discontinuous transmission pattern (DTX pattern) for period of time and a configuration for a UE timer while the network entity 105 operates in the DTX pattern. Accordingly, the UE 115 may execute the timer in a compatible manner with the DTX pattern, such that the UE 115 may communicate a transmission associated with the timer with the network entity 105 upon expiration of the timer. In some examples, the network entity 105 may indicate the timer configuration in an RRC message. In some examples, the network entity 105 may indicate that the network entity 105 will operate in accordance with a DTX pattern in a dynamic message, for example, in DCI or a MAC-CE. In some cases, the control message that indicates that the network entity 105 will operate in accordance with a DTX pattern may also indicate the timer configuration. The network entity 105 may indicate configurations to apply to multiple timers for the UE 115 while the network entity 105 operates in accordance with a DTX pattern.

In some examples, the timer configuration may include stopping the timer based on the network entity 105 entering an inactive transmission mode and resetting the timer (e.g., setting the timer value back to the initial value) based on the network entity 105 entering an active transmission. In some examples, the timer configuration may include pausing the timer based on the network entity 105 entering an inactive transmission mode and resuming the timer based on the network entity 105 entering an active transmission mode. In some examples, the timer configuration may include executing or running the timer using a second value for the timer different than a first value for the timer associated with normal operation of the network entity 105. In some examples, implementing the timer configuration may be based on the network entity 105 being in an inactive transmission mode for a threshold duration of a timer duration of the timer.

Figure 2:
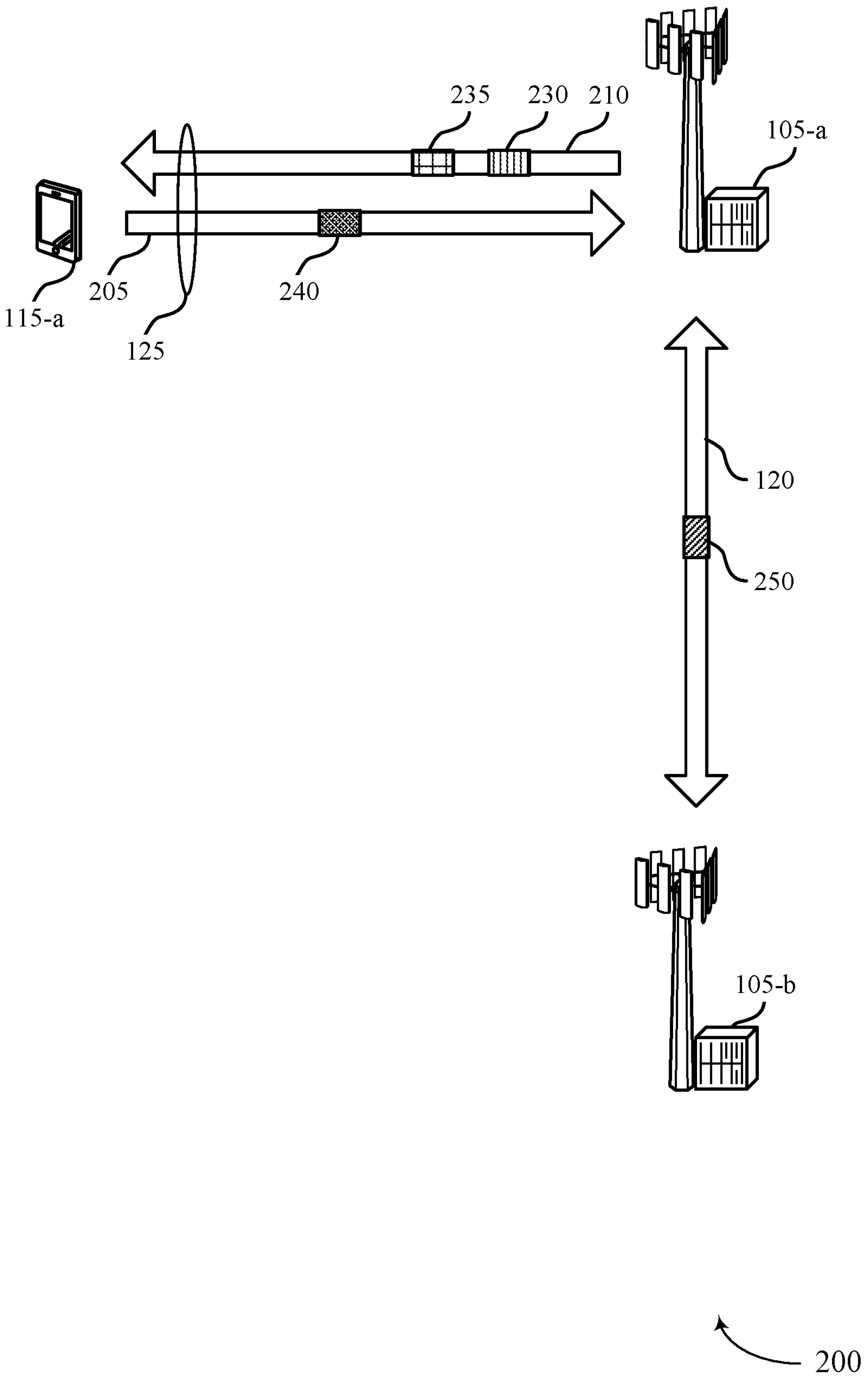
FIG. 2 illustrates another example of a wireless communications system that supports UE timers during cell DTX in accordance with one or more aspects of the present disclosure.

FIG. 2 illustrates an example of a wireless communications system 200 that supports UE timers during cell DTX in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 described with respect to FIG. 1. The wireless communications system 200 also includes a network entity 105-*a* and a network entity 105-*b*, which may be examples of a network entity 105 as described with respect to FIG. 1.

The network entity 105-*a* may communicate with the UE 115-*a* using a communication link 125. The network entity 105-*a* may communicate with the network entity 105-*b* a using a backhaul communication link 120, which may be an example of a backhaul communication link 120 as described with reference to FIG. 1. The communication link 125 may be an example of an NR or LTE link between the UE 115-*a* and the network entity 105-*a*. The communication link 125 may include a bi-directional link that enables both uplink and downlink communications. For example, the UE 115-*a* may transmit uplink signals 205 (e.g., uplink transmissions), such as uplink control signals or uplink data signals, to the network entity 105-*a* using the communication link 125 and the network entity 105-*a* may transmit downlink signals 210 (e.g., downlink transmissions), such as downlink control signals or downlink data signals, to the UE 115-*a* using the communication link 125.

During a DTX, a network entity 105 may be in an inactive mode. During a duration of inactive transmission mode of the DTX pattern, the network entity 105 may not transmit some periodic signals or transmit in some channels, such as common signals or in common channels, as well as signals or in channels specific to the UE 115. Similarly, during a duration of inactive reception mode for a DRX pattern, the network entity 105 may not receive some periodic signals or receive some signals in channels, such as common signals or in common channels, as well as signals or in channels specific to the UE 115.

In the inactive transmission mode, the network entity 105 may not transmit or may have limited transmission. Similarly, in an inactive reception mode, the network entity 105 may not receive or may have limited reception. For example, a UE 115 in a connected mode discontinuous reception (C-DRX) may have DRX cycles or offsets for UEs 115 in the connected mode (e.g., inactive reception mode or idle mode) that are aligned. Aligning the offsets may provide longer inactivity periods at the network entity 105, reducing the network entity's activity, such as transmitting synchronization signal blocks (SSB) or configuration grants (CG), receiving signals over a physical uplink shared channel (PUSCH), receiving random access (RACH) occasions (ROs), and the like, outside of the UE's DRX active time.

The network entity 105 may enter into the inactive mode for a period of time in accordance with a network adaptation of DTX/DRX. In DTX/DRX, the network entity 105 may go into an inactive mode with different time granularities. For example, a C-DRX may be configured for each UE 115, and a period of inactive transmission mode (e.g., DTX) for one UE 115 may be during a period of active transmission mode for another UE 115, based on a scheduler. In this example, the network entity 105 may schedule different UEs 115 to be in different time periods of the network entity 105 being in the active transmission mode or the inactive transmission mode, limiting the inactivity time for the network entity 105. The alignment of the DRX cycles or offsets for the UEs 115 may be performed via RRC configuration or reconfiguration. Since a UE 115 may monitor for at least some signals from the network entity 105 when the network entity 105 is outside the DRX active time, there may be corresponding restrictions to network entity 105 activity time.

The wireless communications system 200 illustrates an example where the network entity 105-*a* may indicate a timer configuration for operation of a timer at the UE 115-*a* associated with a DTX pattern, where the network entity 105-*a* may operate in accordance with the DTX pattern for a period of time. The DTX pattern may indicate that the network entity 105-*a* cycles between an active transmission mode and an inactive transmission mode. The UE 115-*a* may monitor for transmission from the UE 115-*a* during the period of time based on the timer configuration. The signaling framework discussed herein may indicate to the UE 115-*a* behavior for the UE 115-*a*during a sleep mode (e.g., inactive transmission mode) of the network entity 105-*a*. For example, signaling may indicate to the UE 115-*a* to pause all timers associated with the UE 115-*a* when the network entity 105-*a* enters a sleep mode and to restart the timers when the network entity 105-*a* awakens. Operating the timers in this manner may facilitate preventing expiration of the UE timers. Accordingly, the network entity 105 may not rush into serving all UEs 115-*a* associated with the network entity 105-*a* based on the pending timers during the limited duration that the network entity 105-*a* may have for awakening from the sleeping mode.

In some examples, the network entity 105-*a* may be in an inactive transmission mode (e.g., inactive transmission mode of a DTX pattern). The network entity 105-*a* may communicate with the UE 115-*a* during the active transmission mode (e.g., active transmission mode of a DTX pattern). Accordingly, the UE 115-*a* may monitor for signals or specific channels when the network entity 105-*a* is in the active mode to efficiently monitor for signals.

The network entity 105-*a* may transmit control signaling to the UE 115-*a*, including a timer configuration 230 and a DTX pattern 235 over the communication link 125. The DTX pattern 235 may indicate that the network entity 105 will operate or cycle between an active transmission mode and an inactive transmission mode during a period of time. The control signaling may also indicate that the period of time the network entity 105 will operate in accordance with the DTX pattern 235. The timer configuration 230 may include a configuration for operating a timer at the UE 115-*a*based on the DTX pattern 235 at the network entity 105-*a*. For example, the timer configuration 230 may indicate for the UE 115-*a* to pause the timer based on the network entity 105-*a* entering the inactive transmission mode based on the DTX pattern 235, and for the UE 115-*a* to resume the timer based on the network entity 105-*a* entering the active transmission mode based on the DTX pattern. In some examples, the timer configuration 230 may indicate for the UE 115-*a* to stop the timer based on the network entity 105-*a* entering the inactive transmission mode based on the DTX pattern 235, and reset the timer (e.g., reset to an initial value of the timer) based on the network entity 105-*a* entering the active transmission mode.

In some examples, the control signaling may also indicate a threshold, where the timer is operated in accordance with the timer configuration based on the network entity 105-*a* being in the inactive transmission mode for at least a threshold duration of a timer duration. The UE 115-*a* may communicate, to the network entity 105-*a*, an initiate transmission 240 that initiates the timer, and the UE 115-*a* may operate the timer during the period of time based on the timer configuration.

The network entity 105-*a* may transmit a control signaling to a second network entity 105-*b*. For example, the network entity 105-*a* may transmit a DTX configuration pattern 250 to the second network entity 105-*b*. The DTX configuration pattern 250 may indicate UE behavior towards UE timers during the inactive transmission mode of the network entity 105-*a*.

Figure 3:
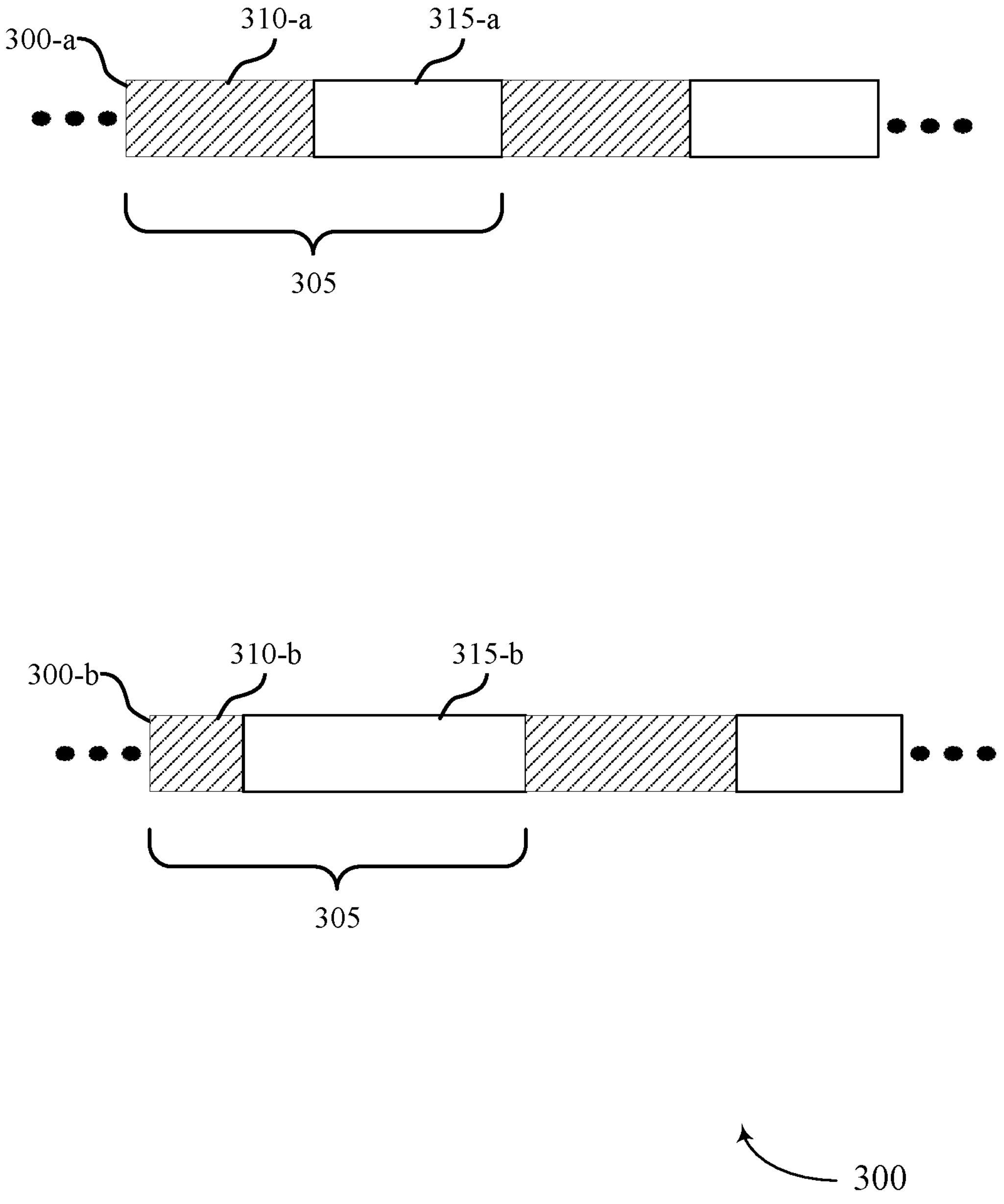
FIG. 3 illustrates an example of discontinuous DTX patterns that support UE timers during cell DTX in accordance with one or more aspects of the present disclosure.

FIG. 3 illustrates an example of a discontinuous DTX patterns 300 that supports UE timers during cell DTX in accordance with one or more aspects of the present disclosure. A first DTX pattern 300-*a* is a predefined periodic pattern and a second DTX pattern 300-*b* is a dynamically triggered pattern. Each of the DTX patterns 300 include one or more instances of a period 305, which includes a period of an active transmission mode 310 and an inactive transmission mode 315. During the inactive transmission mode 315, the network entity 105 may be inactive or in a sleeping state. The active transmission mode 310 and an inactive transmission mode 315 may cycle throughout the DTX patterns 300.

In the first DTX pattern 300-*a*, the duration of active transmission mode 310 and the inactive transmission mode 315 may be predefined or predetermined before the network entity 105 indicates that the network entity 105 is entering a DTX pattern 300. In some examples, the first DTX pattern 300-*a* may be a symmetric pattern of the active transmission modes 310-*a* and inactive transmission modes 315-*a*, where the duration of each of the modes is equal. In some examples, the durations of the active transmission modes 310-*a* and the inactive transmission modes 315-*a* may be different.

In the second DTX pattern 300-*b*, the periods of active transmission mode 310-*b* and the inactive transmission mode 315-*b* may be dynamically triggered, such that the network entity 105 determines the DTX pattern in real time (e.g., not predefined) and based on one or more factors. In some examples, the factors may be adaptive and based on network traffic. For example, if a large quantity of transmission traffic occurs during a period of time, then the inactive transmission mode 315-*b* may have a shorter duration than when the quantity of transmission traffic is smaller. In some examples, the second DTX pattern 300-*b* may include equal or unequal durations of the active transmission mode 310-*b* and the inactive transmission modes 315-*b* based on the one or more factors.

In some cases, regardless of the discontinuous pattern, the UE 115 may continue monitoring SSBs from the network entity 105 (e.g., SSBs are not skipped even based on the DTX pattern 300). In particular, the period of DTX or inactive transmission mode may be shorter than the period for communicating SSBs (e.g., 10 millisecond (ms) for DTX and 20 ms for SSBs). In some examples, the network entity 105 may inform UEs 115 in a cell to stop monitoring a physical downlink control channel (PDCCH) and to stop measuring channel state information reference signal (CSI-RS).

In some examples, a timer at the UE 115 may be triggered when a UE 115 attempts to transmit RRC requests (e.g., setup constraints, reestablishment requests, etc.) to connect to the network entity 105. For example, the UE 115 may read or operate a timer based on a protocol (e.g., 3GPP Release 18 (Rel. 18) of the 5G standard), for example, that indicates a semi-static periodic cell DTX pattern with some durations for the active transmission modes 310 and inactive transmission modes 315. For example, the DTX pattern may include 10 ms of active transmission mode and 10 ms of inactive transmission mode in each period. The UE 115 may attempt to connect to a network entity 105 (e.g., a cell), transmit an RRC request, such as a RRC setup request in a message (e.g., via a RRCSetupRequest or RRCConnectionRequest message), and the UE 115 may start a timer for the network to respond to the request. For example, the UE timer may be a T300 timer, which is a 100 ms timer. The network entity 105 may enter an inactive transmission mode 315 for 5 ms (e.g., sleep mode), during which the timer period for T300 is running. The network entity 105 may be in the inactive transmission mode 315 for 50 ms of the 100 ms duration, and thus, the network entity 105 may not timely respond to the RRC request. As will be discussed in detail with respect to FIG. 4, the UE 115 may adjust the timer in accordance with a timer configuration associated with the DTX pattern 300 at the network entity 105, such as by stopping or pausing the timer to prevent expiration of the timer, so that the network entity 105 may awaken and respond to the request.

Figure 4:
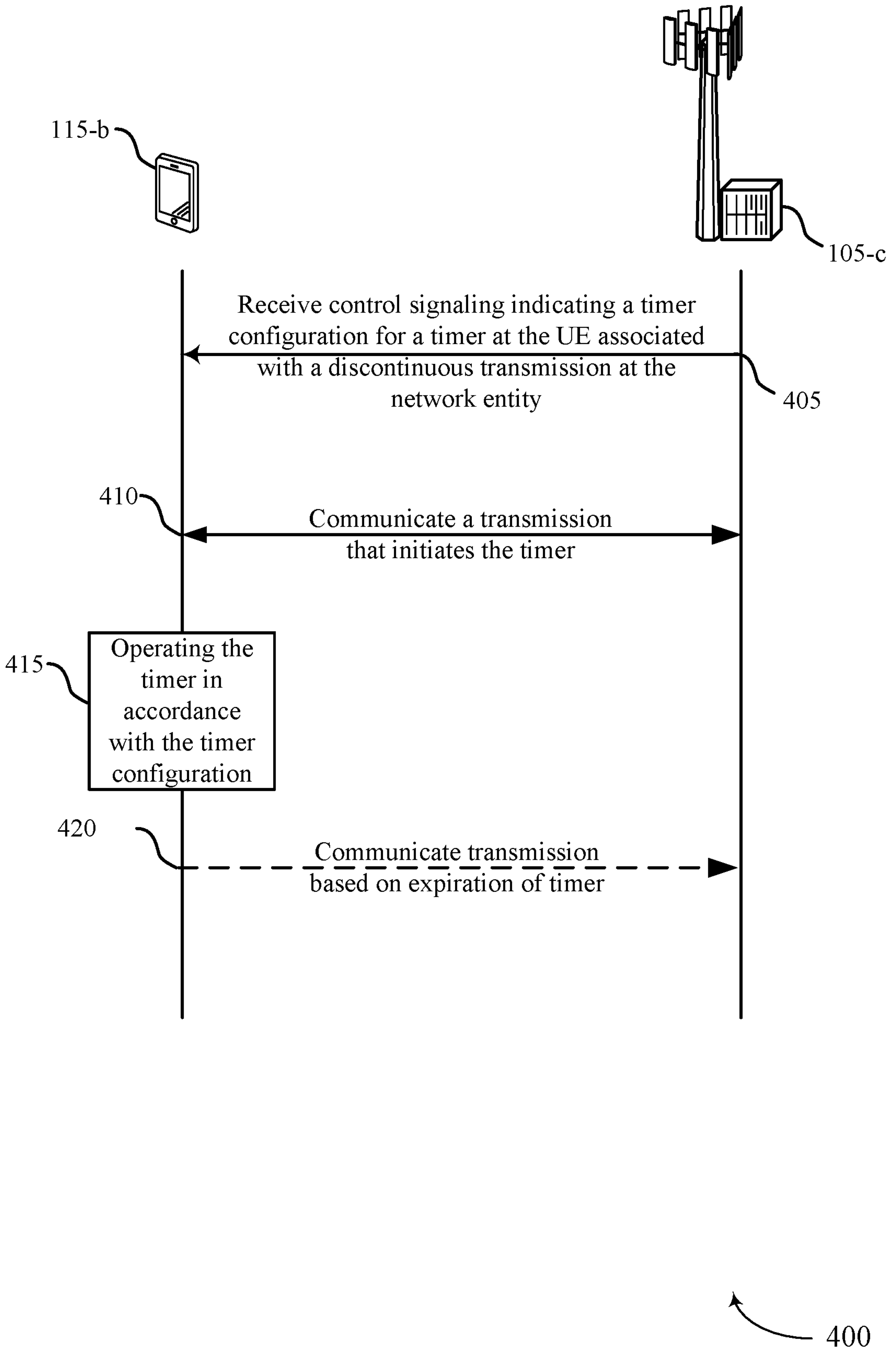
FIG. 4 illustrates an example of a process flow that supports UE timers during cell DTX in accordance with one or more aspects of the present disclosure.

FIG. 4 illustrates an example of a process flow 400 that supports UE timers during cell DTX in accordance with one or more aspects of the present disclosure. The process flow 400 may implement aspects of or may be implemented by aspects of the wireless communications system 100 or the wireless communications system 200. For example, the process flow 400 may include a UE 115-*b*, which may be an example of a UE 115 as described herein. The process flow 400 may include a network entity 105-*c*, which may be an example of a network entity 105 as described herein. In the following description of the process flow 400, the operations performed by the network entity 105-*c* and the UE 115-*b* may be performed in different orders or at different times than the exemplary order shown. Some operations may also be omitted from the process flow 400, or other operations may be added to the process flow 400. Further, while operations in the process flow 400 are illustrated as being performed by the network entity 105-*c* and the UE 115-*b*, the examples herein are not to be construed as limiting, as the described features may be associated with any quantity of different devices.

At 405, the UE 115-*b* may receive, from the network entity 105-*c*, control signaling indicating a timer configuration for operation of a timer at the UE 115-*b* associated with a DTX pattern at the network entity 105-*c*. The control signaling may indicate that the network entity 105-*c* will operate in accordance with the DTX pattern for a period of time. The DTX pattern may indicate that the network entity 105-*c* cycles between an active transmission mode and an inactive transmission mode during the period of time. In some examples, receiving the control signaling includes receiving a first control message indicating the timer configuration, and receiving a second control message indicating that the network entity 105-*c* will operate in accordance with the DTX pattern for the period of time. In some examples, the same control message may indicate the timer configuration and that the network entity 105-*c* will operate in accordance with the DTX pattern for the period of time.

At 410, the UE 115-*b* may communicate, with the network entity 105-*c*, a transmission that initiates the timer. In some examples, operating the timer involves stopping the timer based on the network entity 105-*c* entering the inactive transmission mode (e.g., TX inactive state) based on the DTX pattern, and resetting the timer or starting a new timer based on the network entity 105-*c* entering the active transmission mode (e.g., TX active state) based on DTX pattern.

At 415, the UE 115-*b* may operate the timer during the period of time based on the timer configuration. In some examples, operating the timer may involve pausing the timer based on the network entity 105-*c* entering the inactive transmission mode in accordance with the DTX pattern, and resuming or restarting the timer based on the network entity 105-*c* entering the active transmission mode in accordance with the DTX pattern. In some examples, operating the timer may involve operating the timer using a second value for the timer different than a first value for the timer associated with the active transmission mode (e.g., behavior associated with 3GPP Release 17 (Rel. 17) of the 5G standard). The second value may be indicated in the timer configuration. The different values may be determined using a reference or a baseline value, as well as one or more scaling factors, such as the duration that the network entity 105-*c* is sleeping or in the inactive transmission mode.

In some examples, operating the timer may involve implementing the timer configuration based on the network entity 105-*c* being in the inactive transmission mode for at least a threshold duration of a timer duration of the timer (e.g., inactive transmission mode is less than X % of the timer duration). By way of example, such as for the T300 timer, the estimated inactive transmission mode may be approximately 50% of the entire timer duration. The UE 115-*b* may continue using T300 and corresponding configuration. However, in another example, a T310 timer may have an expiration of 50 ms. The network entity 105-*c* may enter an inactive transmission mode in 30 ms, which is 60% of the T310 duration. In this example, the UE 115-*b* may not implement the timer configuration where the network entity 105-*c* is in the inactive transmission mode for the threshold duration of the timer duration of the timer. Another one or more implementations may be used, like the implementation involving pausing and resuming the timer. In some examples, the UE 115-*b* may apply one of the implementations for each timer, while in other examples the UE 115-*b* may apply one option for some timers and other options for other timers (e.g., timers T300 to T322) or for a subset of timers.

In some examples, the UE 115-*b* may implement particular timer operations based on one or more parameters associated with the timer. For example, the parameters may include a quantity of consecutive out-of-sync indications, a quantity of consecutive in-sync indications, and the like (e.g., parameters associated with timers N310 and N311).

When a network entity 105-*c* is in an energy saving mode, such that it may operate with DTX, the network entity 105-*c* may decrease or drop the transmission of a subset of radio link monitoring reference signals (RLM-RS) (e.g., SSB, CSI-RS signals, or both), or may send the signals with different configurations (e.g., in terms of transmission power, beamforming configuration, or both). The decrease or drop of transmission or different configurations may impact the RLM at the UE 115-*b*.

In addition to modifying the UE's 115-*b* associated timers, the value of other related parameters may be defined differently for the active transmission mode (e.g., normal state) and the inactive transmission mode (e.g., DTX, energy saving state) operations, as well as for normal operation mode and energy saving operation mode. For example, a smaller quantity of in-sync indications (e.g., N311) may be used when the network entity 105-*c* is in the inactive transmission mode, or when the network entity 105-*c* is in an energy saving operation mode, a DTX mode, or the like.

Similarly, a larger quantity of out-of-sync indications (e.g., N310) may be used to trigger an associated timer (e.g., timer T310), such as when a quantity of out-of-sync indications satisfies a threshold (e.g., exceeds a threshold). Some of the out-of-sync indications may be a result of the network entity 105-*c* not sending RLM-RS or changing the respective configuration (e.g., not as a result of link quality degradation). However, a larger quantity of out-of-sync indications or making the timers effectively longer may result in a slow response from the UE 115-*b* when there is a radio link failure (RLF). Accordingly, the network may provide the configurations. In some examples, the UE 115-*b* may not be provided with the exact or entire configuration of the network entity 105-*c* (e.g., the exact on-off DTX pattern or change in transmission configuration of RLM-RS). Otherwise, UE 115-*b* may consider the exact configuration to normalize or modify its measurements. Accordingly, the out-of-sync indications may be used to trigger a timer.

In some examples, at 420 the UE 115-*b* may communicate, with the network entity 105-*c*, a second transmission that initiates a second timer; and the UE 115-*b* may communicate the second timer based on the timer configuration. The timer configuration may indicate a first configuration for the timer and a second configuration for the second timer. In some examples, the network entity 105-*c* may transmit, to a second network entity, second control signaling indicating the second timer configuration.

In some examples, at 420, the UE 115-*b* may communicate a second transmission with the network entity 105-*c* based on an expiration of the timer based on the timer configuration. Accordingly, the network entity 105-*c* may monitor for the transmission from the UE during the period of time that the network entity 105-*c* is operating in accordance with the DTX pattern based on the indicated timer configuration.

The UE 115-*b* may apply one or more of the techniques for operating a UE timer. For example, the UE 11-*b* may apply one or more of the techniques to one or more timers. The operations may correlate with RRC configuration, reconfiguration, and the like. The network entity 105-*c* may inform the UE 115-*b* about its behavior during the inactive transmission mode via transmission of its DTX pattern(s) (via RRC or system information (SI), or DCI, MAC CE indicating which a dynamic cell DTX pattern is being applied). The network entity 105-*c* may also inform the UE 115-*b* about the behavior of the network entity 105-*c* during the inactive transmission mode via the transmission of the timer configuration (and/or other associated parameters like quantity of in-sync or out-of-sync indications) values (e.g., for T310, together with the RRC information element (IE) "RLF-TimersAndConstants"), allowing for a separate UE 115-*b* behavior per timer. The indications may be transmitted via DCI or MAC-CE for each timer. The UE's behavior (e.g., implementation of timer operation) towards the respective timers during the inactive transmission mode may be exchanged, via control signaling, between network entities 105, such as the network entities 105-*a* and the network entity 105-*b* as described with reference to FIG. 2. In some examples, the network entity 105-*b* may be in different modes of operation (e.g., normal active transmission mode and one or multiple energy saving/inactive transmission modes), where the DTX configuration of the network entity 105-*b* in the inactive transmission mode is different than the active transmission mode timers, and other associated parameters may be configured differently in different modes.

Figure 5:
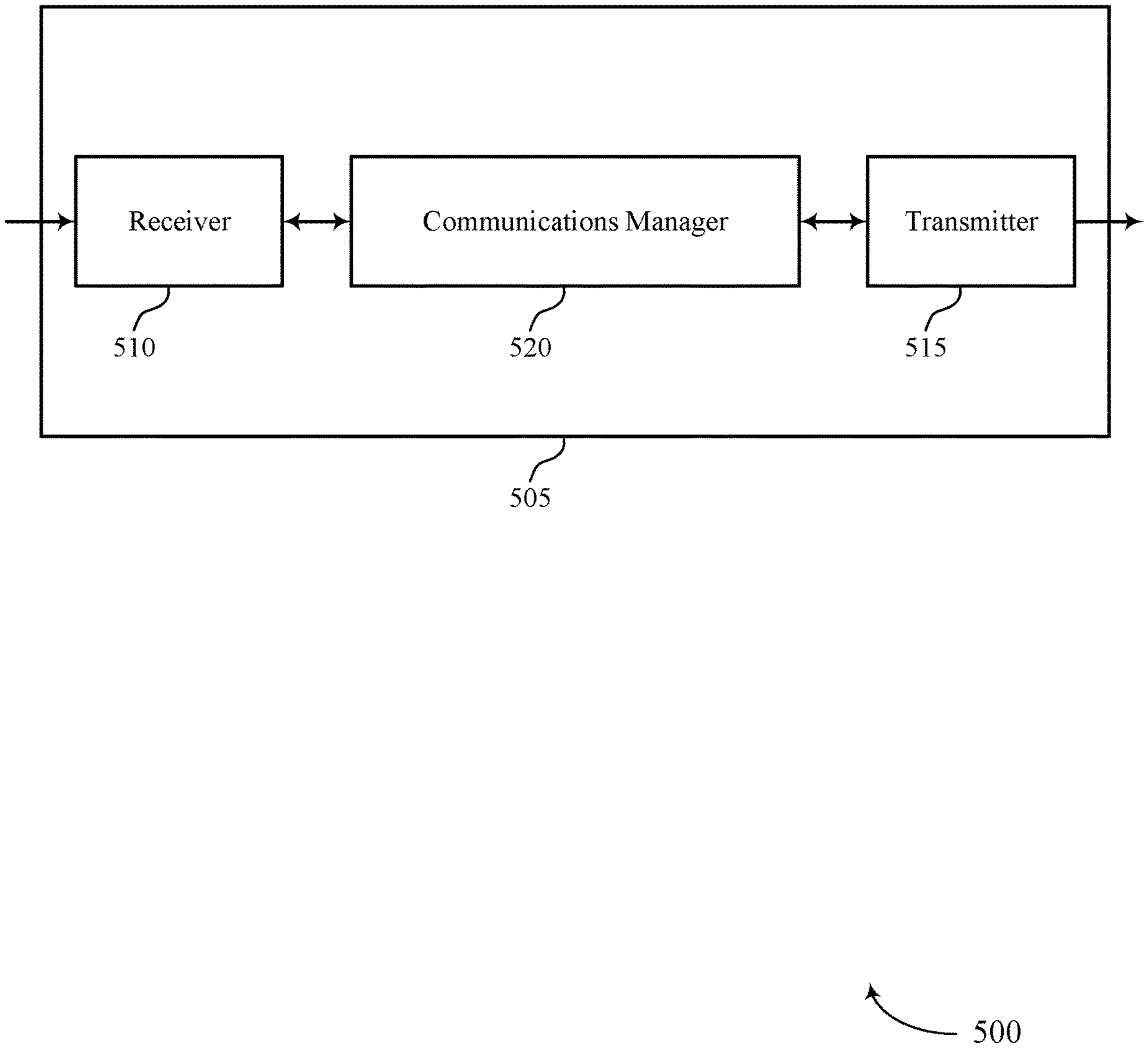
FIGS. 5 and 6 illustrate block diagrams of devices that support UE timers during cell DTX in accordance with one or more aspects of the present disclosure.

FIG. 5 illustrates a block diagram 500 of a device 505 that supports UE timers during cell DTX in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE timers during cell DTX). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE timers during cell DTX). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE timers during cell DTX as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The communications manager 520 may be configured as or otherwise support a means for communicating, with the network entity, a transmission that initiating the timer. The communications manager 520 may be configured as or otherwise support a means for operating the timer during the period of time in accordance with the timer configuration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing or preventing UE timers from expiring so that the network may timely respond to a UE request.

Figure 6:
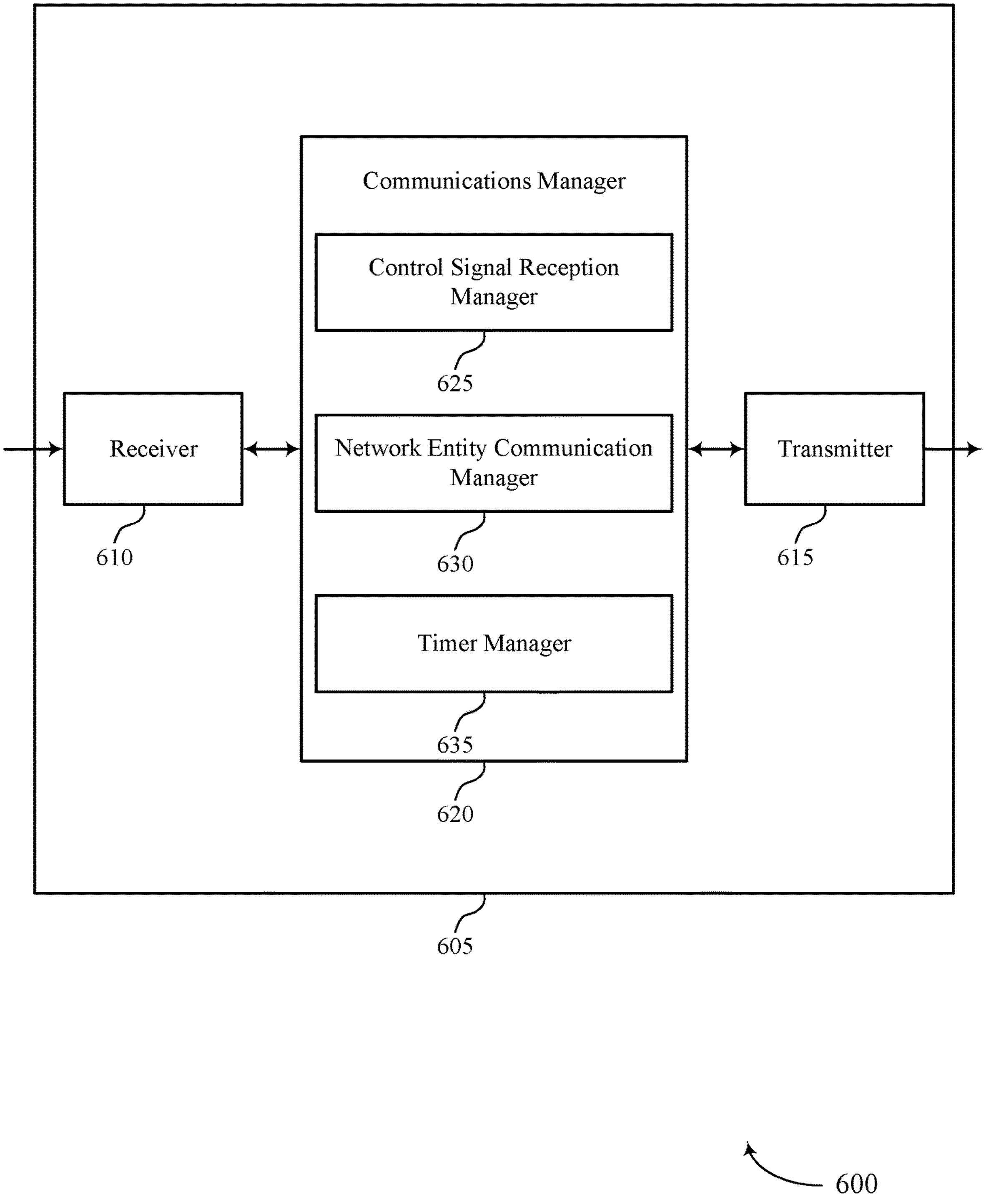

FIG. 6 illustrates a block diagram 600 of a device 605 that supports UE timers during cell DTX in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE timers during cell DTX). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE timers during cell DTX). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE timers during cell DTX as described herein. For example, the communications manager 620 may include a control signal reception manager 625, a network entity communication manager 630, a timer manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The control signal reception manager 625 may be configured as or otherwise support a means for receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The network entity communication manager 630 may be configured as or otherwise support a means for communicating, with the network entity, a transmission that initiates the timer. The timer manager 635 may be configured as or otherwise support a means for operating the timer during the period of time in accordance with the timer configuration.

Figure 7:
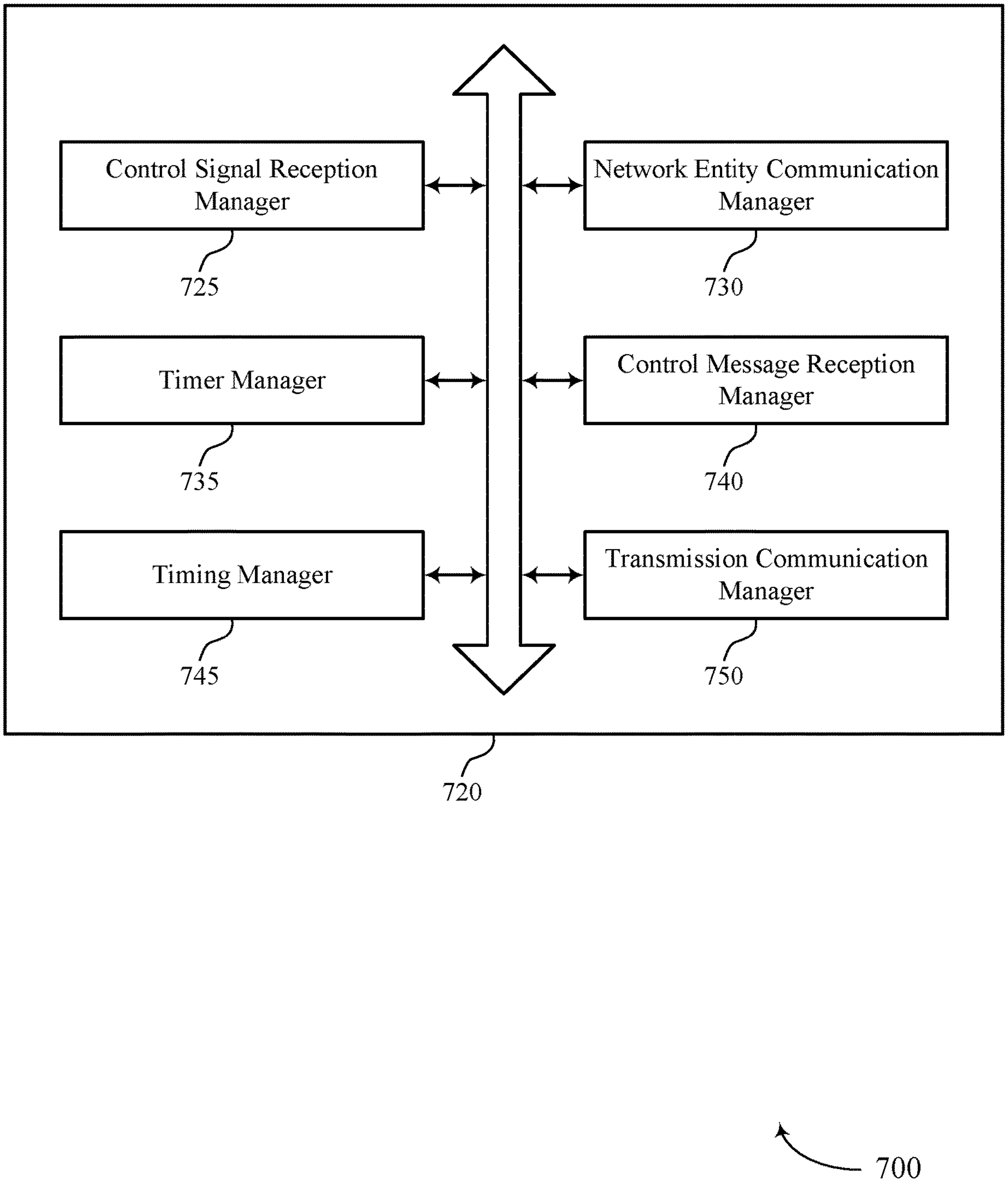
FIG. 7 illustrates a block diagram of a communications manager that supports UE timers during cell DTX in accordance with one or more aspects of the present disclosure.

FIG. 7 illustrates a block diagram 700 of a communications manager 720 that supports UE timers during cell DTX in accordance with one or more aspects of the present disclosure. The communications manager 720 may be an example of aspects of a communications manager 520, a communications manager 620, or both, as described herein. The communications manager 720, or various components thereof, may be an example of means for performing various aspects of UE timers during cell DTX as described herein. For example, the communications manager 720 may include a control signal reception manager 725, a network entity communication manager 730, a timer manager 735, a control message reception manager 740, a timing manager 745, a transmission communication manager 750, or any combination thereof. Each of these components may communicate, directly or indirectly, with one another (e.g., via one or more buses).

The communications manager 720 may support wireless communications at a UE in accordance with examples as disclosed herein. The control signal reception manager 725 may be configured as or otherwise support a means for receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The network entity communication manager 730 may be configured as or otherwise support a means for communicating, with the network entity, a transmission that initiates the timer. The timer manager 735 may be configured as or otherwise support a means for operating the timer during the period of time in accordance with the timer configuration.

In some examples, to support receiving the control signaling, the control message reception manager 740 may be configured as or otherwise support a means for receiving a first control message indicating the timer configuration. In some examples, to support receiving the control signaling, the control message reception manager 740 may be configured as or otherwise support a means for receiving a second control message indicating that the network entity will operate in accordance with the DTX pattern for the period of time.

In some examples, to support operating the timer in accordance with the timer configuration, the timer manager 735 may be configured as or otherwise support a means for stopping the timer based on the network entity entering the inactive transmission mode in accordance with the DTX pattern. In some examples, to support operating the timer in accordance with the timer configuration, the timer manager 735 may be configured as or otherwise support a means for resetting the timer based on the network entity entering the active transmission mode in accordance with the DTX pattern.

In some examples, to support operating the timer in accordance with the timer configuration, the timing manager 745 may be configured as or otherwise support a means for pausing the timer based on the network entity entering the inactive transmission mode in accordance with the DTX pattern. In some examples, to support operating the timer in accordance with the timer configuration, the timer manager 735 may be configured as or otherwise support a means for resuming the timer based on the network entity entering the active transmission mode in accordance with the DTX pattern.

In some examples, to support operating the timer in accordance with the timer configuration, the timer manager 735 may be configured as or otherwise support a means for operating the timer using a second value for the timer different than a first value for the timer associated with the active transmission mode, the second value indicated in the timer configuration.

In some examples, to support operating the timer in accordance with the timer configuration, the timer manager 735 may be configured as or otherwise support a means for implementing the timer configuration based on the network entity being in the inactive transmission mode for at least a threshold duration of a timer duration of the timer.

In some examples, the transmission communication manager 750 may be configured as or otherwise support a means for communicating, with the network entity, a second transmission that initiates a second timer. In some examples, the timer manager 735 may be configured as or otherwise support a means for executing or running the second timer in accordance with the timer configuration.

In some examples, the timer configuration indicates a first configuration for the timer and a second configuration for the second timer.

In some examples, the transmission communication manager 750 may be configured as or otherwise support a means for communicating a second transmission with the network entity based on an expiration of the timer in accordance with the timer configuration.

Figure 8:
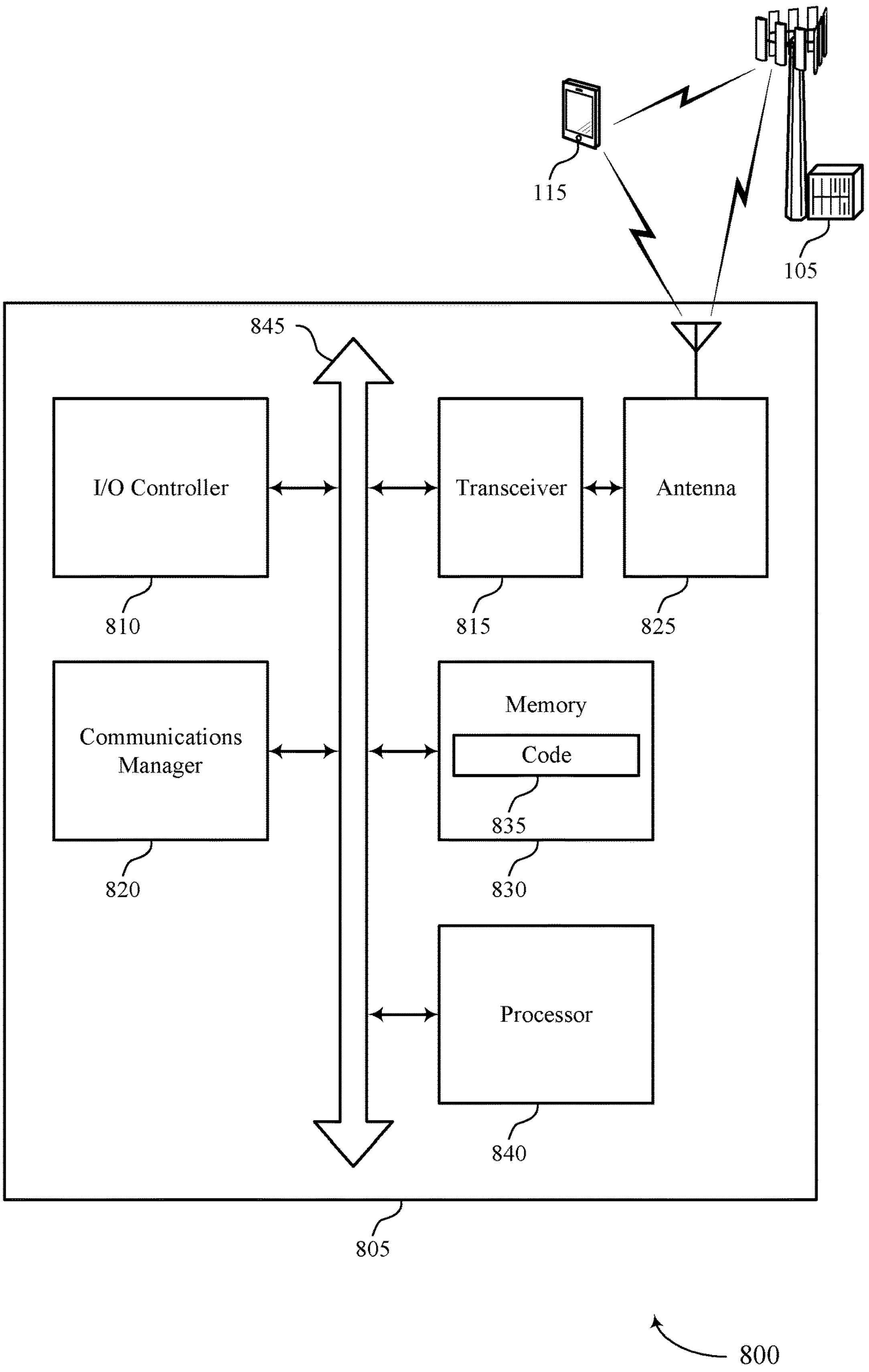
FIG. 8 illustrates a diagram of a system including a device that supports UE timers during cell DTX in accordance with one or more aspects of the present disclosure.

FIG. 8 illustrates a diagram of a system 800 including a device 805 that supports UE timers during cell DTX in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting UE timers during cell DTX). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The communications manager 820 may be configured as or otherwise support a means for communicating, with the network entity, a transmission that initiating the timer. The communications manager 820 may be configured as or otherwise support a means for operating the timer during the period of time in accordance with the timer configuration.

By including or configuring the communications manager 820 in accordance with examples as described herein, the device 805 may support techniques for reducing or preventing UE timers from expiring so that the network may timely respond to a UE request.

In some examples, the communications manager 820 may be configured to perform various operations (e.g., receiving, monitoring, transmitting) using or otherwise in cooperation with the transceiver 815, the one or more antennas 825, or any combination thereof Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of UE timers during cell DTX as described herein, or the processor 840 and the memory 830 may be otherwise configured to perform or support such operations.

Figure 9:
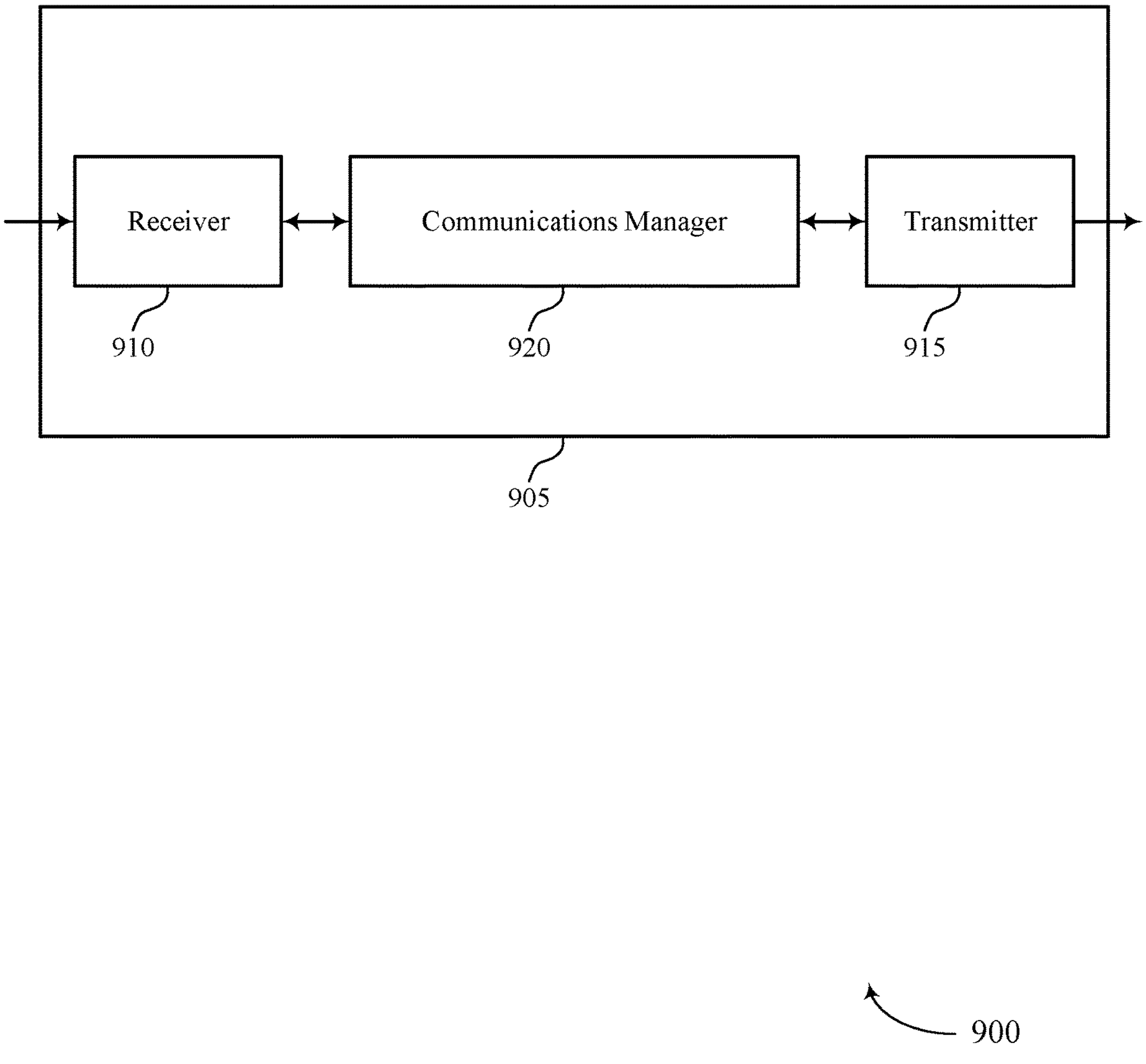
FIGS. 9 and 10 illustrate block diagrams of devices that support UE timers during cell DTX in accordance with one or more aspects of the present disclosure.

FIG. 9 illustrates a block diagram 900 of a device 905 that supports UE timers during cell DTX in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., UQ samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of UE timers during cell DTX as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The communications manager 920 may be configured as or otherwise support a means for communicating, with the UE, a transmission that initiating a timer at the UE. The communications manager 920 may be configured as or otherwise support a means for monitoring for a transmission from the UE during the period of time based on the timer configuration.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing or preventing UE timers from expiring so that the network may timely respond to a UE request.

Figure 10:
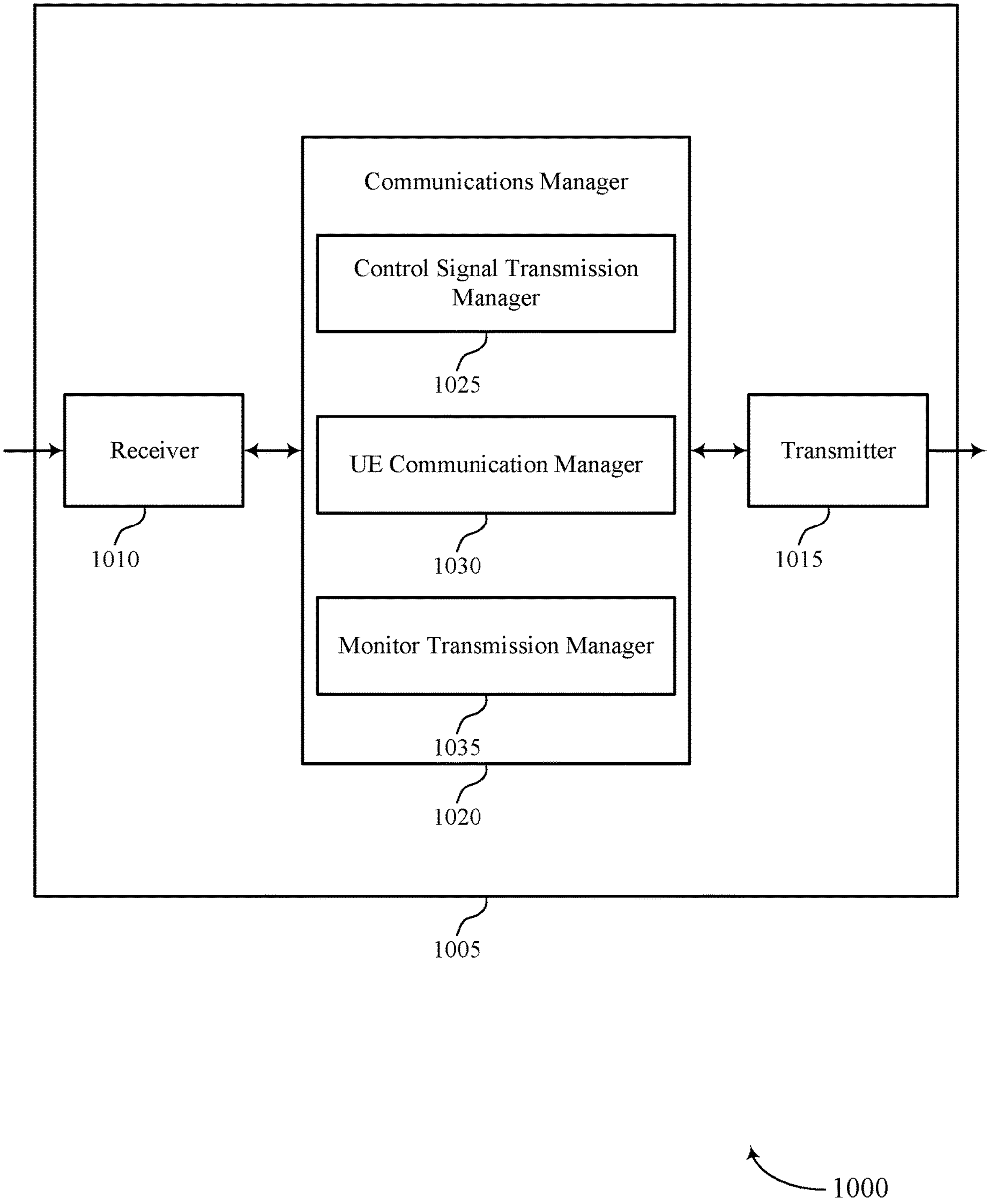

FIG. 10 illustrates a block diagram 1000 of a device 1005 that supports UE timers during cell DTX in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof In some examples, the transmitter 1015 and the receiver 1010 may be co-located in a transceiver, which may include or be coupled with a modem.

The device 1005, or various components thereof, may be an example of means for performing various aspects of UE timers during cell DTX as described herein. For example, the communications manager 1020 may include a control signal transmission manager 1025, a UE communication manager 1030, a monitor transmission manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The control signal transmission manager 1025 may be configured as or otherwise support a means for transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The UE communication manager 1030 may be configured as or otherwise support a means for communicating, with the UE, a transmission that initiates a timer at the UE. The monitor transmission manager 1035 may be configured as or otherwise support a means for monitoring for a transmission from the UE during the period of time based on the timer configuration.

Figure 11:
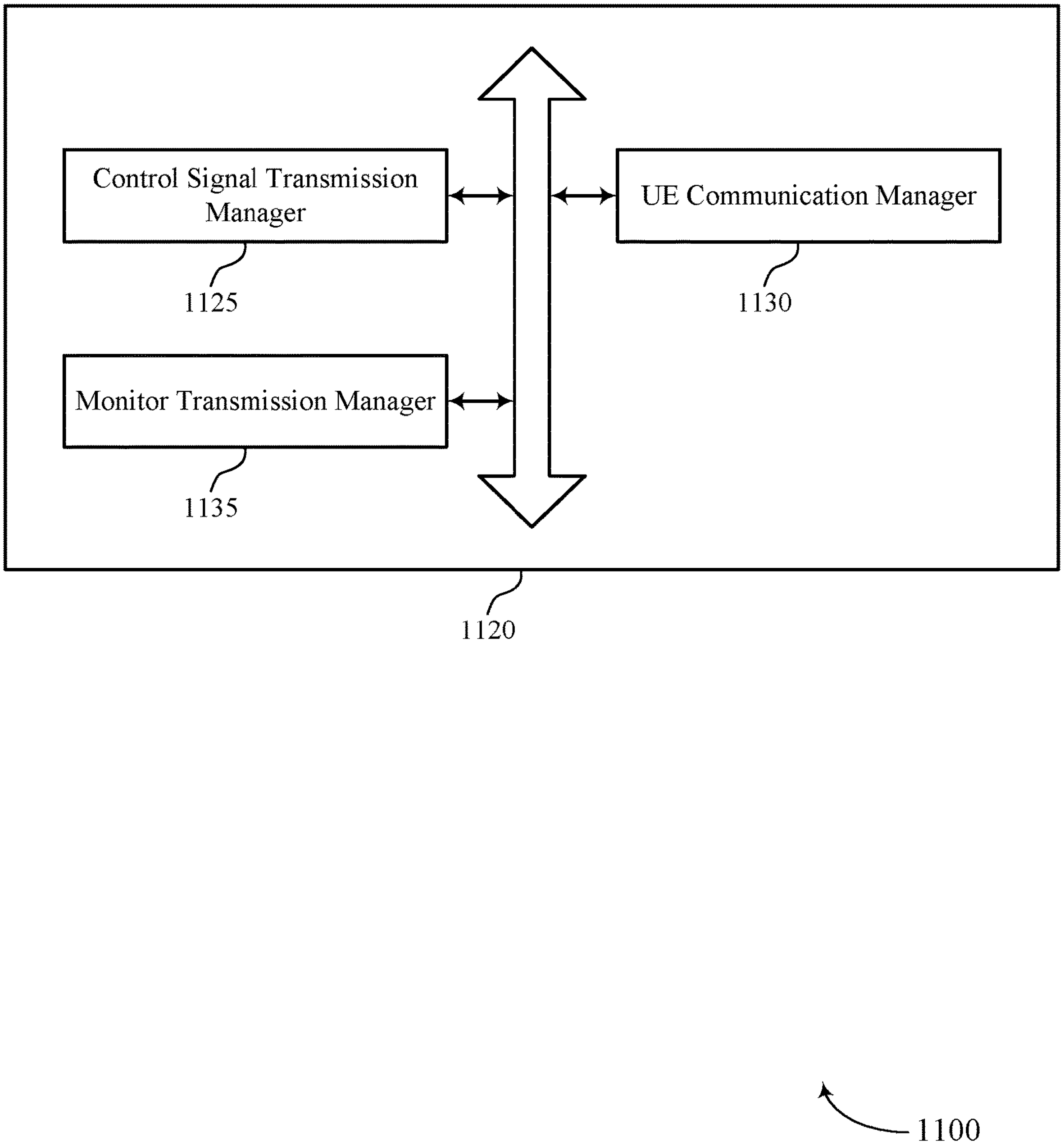
FIG. 11 illustrates a block diagram of a communications manager that supports UE timers during cell DTX in accordance with one or more aspects of the present disclosure.

FIG. 11 illustrates a block diagram 1100 of a communications manager 1120 that supports UE timers during cell DTX in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of UE timers during cell DTX as described herein. For example, the communications manager 1120 may include a control signal transmission manager 1125, a UE communication manager 1130, a monitor transmission manager 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof The communications manager 1120 may support wireless communications at a network entity in accordance with examples as disclosed herein. The control signal transmission manager 1125 may be configured as or otherwise support a means for transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The UE communication manager 1130 may be configured as or otherwise support a means for communicating, with the UE, a transmission that initiates a timer at the UE. The monitor transmission manager 1135 may be configured as or otherwise support a means for monitoring for a transmission from the UE during the period of time based on the timer configuration.

In some examples, the control signal transmission manager 1125 may be configured as or otherwise support a means for transmitting, to a second network entity, second control signaling indicating the timer configuration.

In some examples, to support transmitting the control signaling, the control signal transmission manager 1125 may be configured as or otherwise support a means for transmitting a first control message indicating the timer configuration. In some examples, to support transmitting the control signaling, the control signal transmission manager 1125 may be configured as or otherwise support a means for transmitting a second control message indicating that the network entity will operate in accordance with the DTX pattern for the period of time.

In some examples, to support transmitting the control signaling, the control signal transmission manager 1125 may be configured as or otherwise support a means for transmitting the control signaling indicating the timer configuration indicating for the UE to stop the timer based on the network entity entering the inactive transmission mode in accordance with the DTX pattern and for the UE to reset the timer based on the network entity entering the active transmission mode in accordance with the DTX pattern.

In some examples, to support transmitting the control signaling, the control signal transmission manager 1125 may be configured as or otherwise support a means for transmitting the control signaling indicating the timer configuration indicating for the UE to pause the timer based on the network entity entering the inactive transmission mode in accordance with the DTX pattern and for the UE to resume the timer based on the network entity entering the active transmission mode in accordance with the DTX pattern.

In some examples, to support transmitting the control signaling, the control signal transmission manager 1125 may be configured as or otherwise support a means for transmitting the control signaling indicating the timer configuration indicating for the UE to use a second value for the timer different than a first value for the timer associated with the active transmission mode of the network entity, the second value indicated in the timer configuration.

In some examples, to support operating the timer in accordance with the timer configuration, the control signal transmission manager 1125 may be configured as or otherwise support a means for transmitting the control signaling indicating the timer configuration indicating for the UE to implement the timer configuration based on the network entity being in the inactive transmission mode for at least a threshold duration of a timer duration of the timer.

In some examples, the UE communication manager 1130 may be configured as or otherwise support a means for communicating, with the UE, a transmission that initiates a second timer at the UE in accordance with the timer configuration, where monitoring for the transmission includes monitoring for the transmission based on the timer, the second timer, and the timer configuration.

In some examples, the timer configuration indicates a first configuration for the timer and a second configuration for the second timer.

Figure 12:
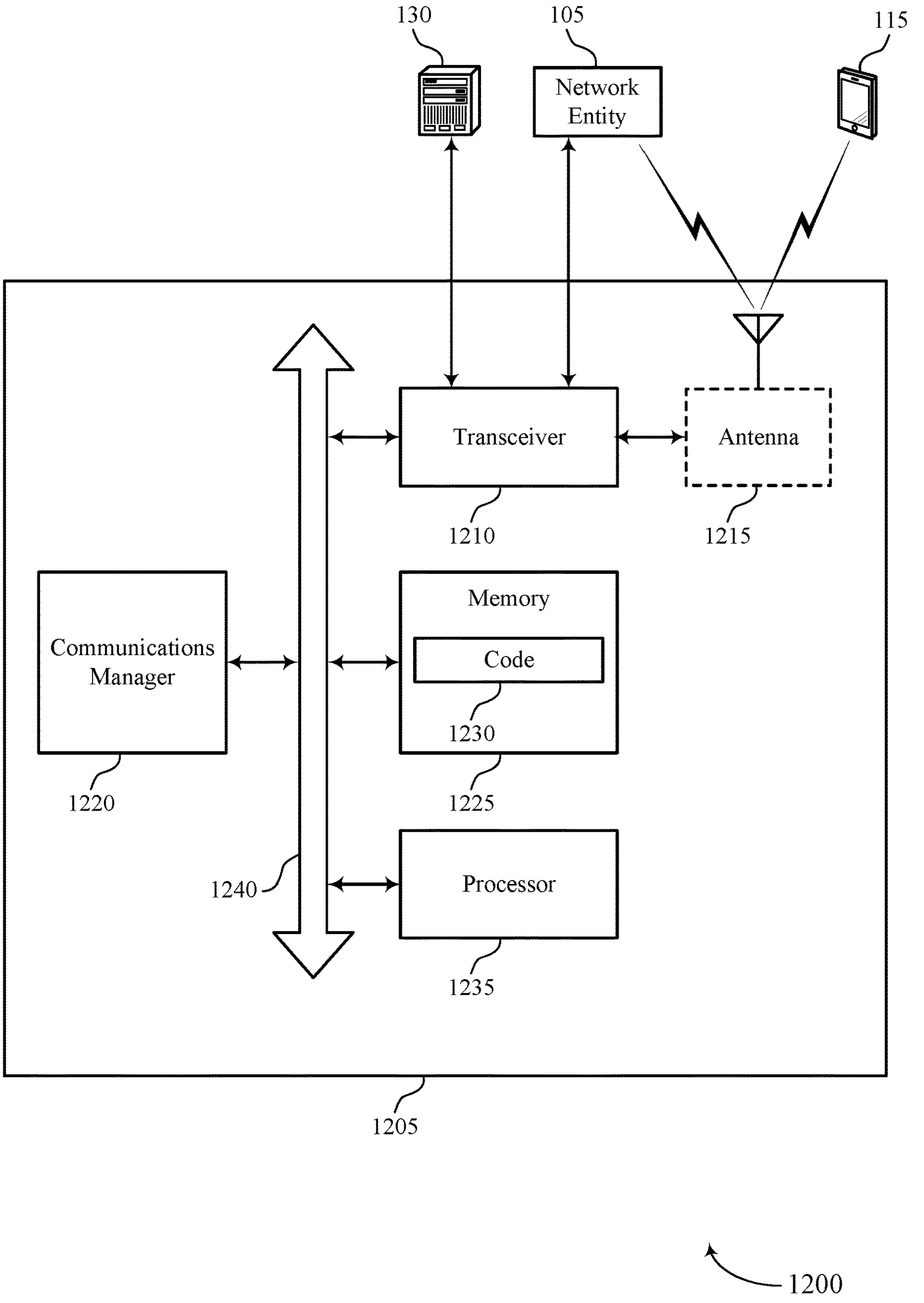
FIG. 12 illustrates a diagram of a system including a device that supports UE timers during cell DTX in accordance with one or more aspects of the present disclosure.

FIG. 12 illustrates a diagram of a system 1200 including a device 1205 that supports UE timers during cell DTX in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting UE timers during cell DTX). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The communications manager 1220 may be configured as or otherwise support a means for communicating, with the UE, a transmission that initiating a timer at the UE. The communications manager 1220 may be configured as or otherwise support a means for monitoring for a transmission from the UE during the period of time based on the timer configuration.

By including or configuring the communications manager 1220 in accordance with examples as described herein, the device 1205 may support techniques for reducing or preventing UE timers from expiring so that the network may timely respond to a UE request.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of UE timers during cell DTX as described herein, or the processor 1235 and the memory 1225 may be otherwise configured to perform or support such operations.

Figure 13:
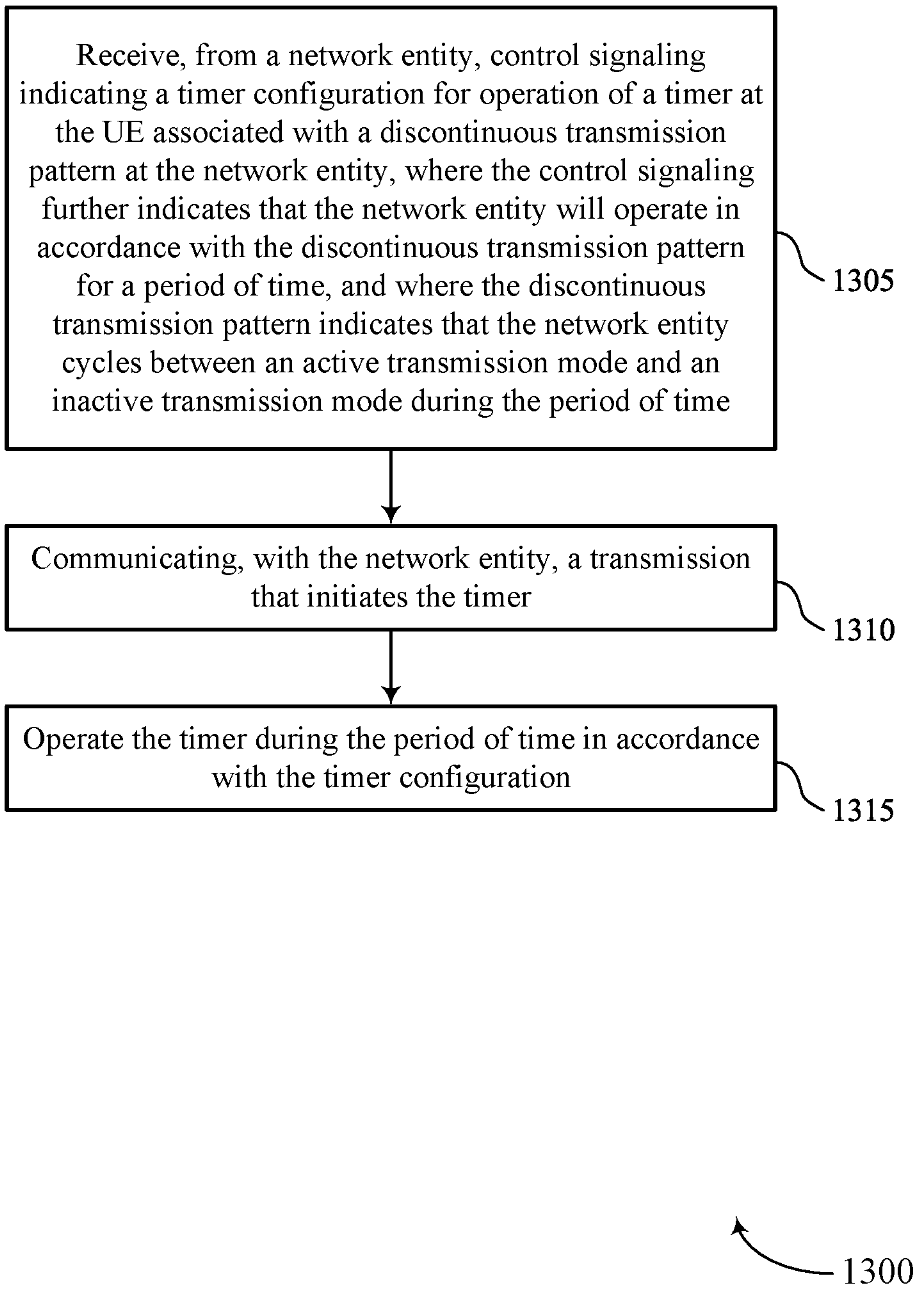
FIGS. 13 and 14 illustrate flowcharts showing methods that support UE timers during cell DTX in accordance with one or more aspects of the present disclosure.

FIG. 13 illustrates a flowchart showing a method 1300 that supports UE timers during cell DTX in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The operations of 1305 may be performed in accordance with examples as disclosed herein. In some examples, aspects of the operations of 1305 may be performed by a control signal reception manager 725 as described with reference to FIG. 7.

At 1310, the method may include communicating, with the network entity, a transmission that initiates the timer. The operations of 1310 may be performed in accordance with examples as disclosed herein. In some examples, aspects of the operations of 1310 may be performed by a network entity communication manager 730 as described with reference to FIG. 7.

At 1315, the method may include operating the timer during the period of time in accordance with the timer configuration. The operations of 1315 may be performed in accordance with examples as disclosed herein. In some examples, aspects of the operations of 1315 may be performed by a timer manager 735 as described with reference to FIG. 7.

Figure 14:
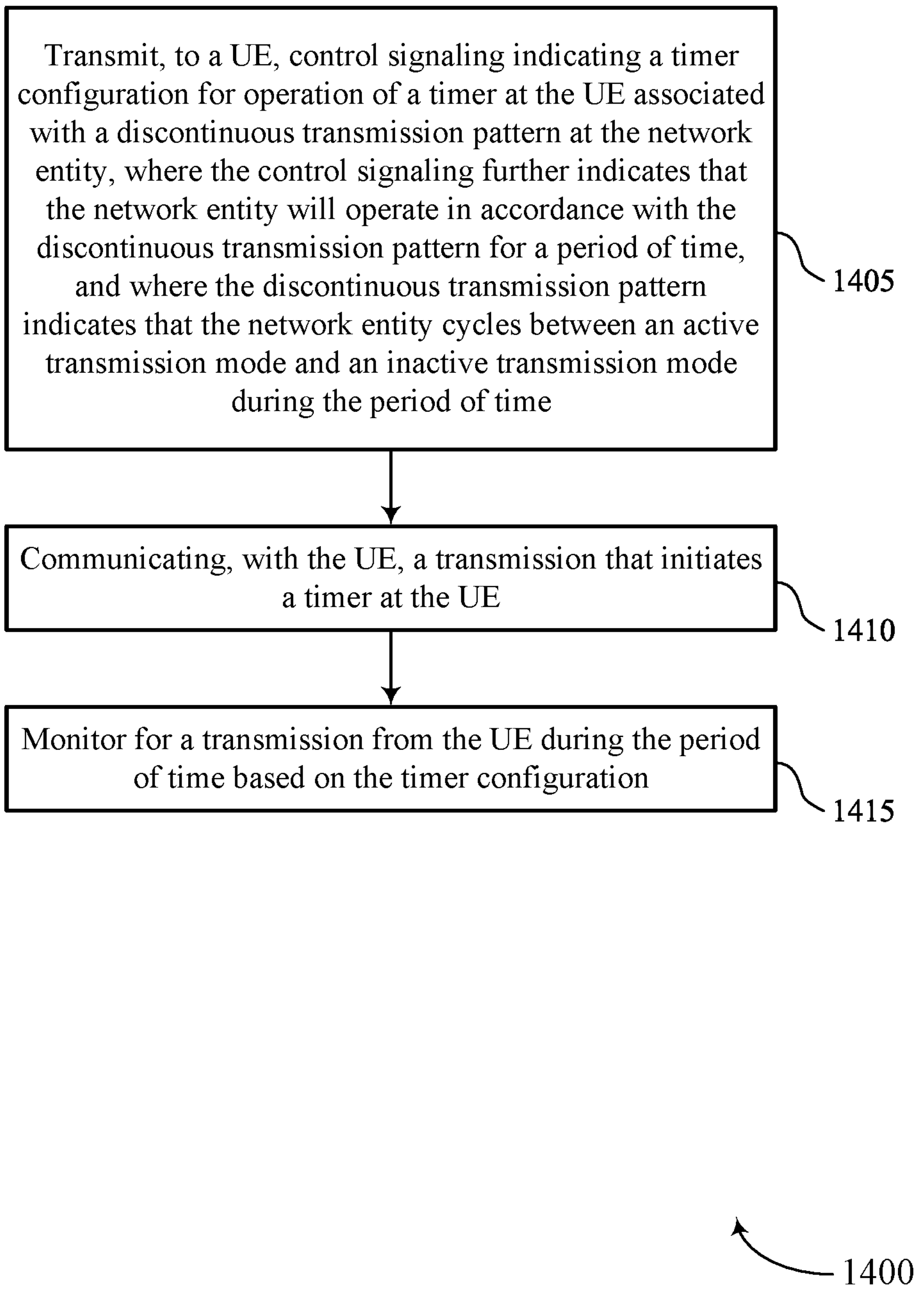

FIG. 14 illustrates a flowchart showing a method 1400 that supports UE timers during cell DTX in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, control signaling indicating a timer configuration for operation of a timer at the UE associated with a DTX pattern at the network entity, where the control signaling further indicates that the network entity will operate in accordance with the DTX pattern for a period of time, and where the DTX pattern indicates that the network entity cycles between an active transmission mode and an inactive transmission mode during the period of time. The operations of 1405 may be performed in accordance with examples as disclosed herein. In some examples, aspects of the operations of 1405 may be performed by a control signal transmission manager 1125 as described with reference to FIG. 11.

At 1410, the method may include communicating, with the UE, a transmission that initiates a timer at the UE. The operations of 1410 may be performed in accordance with examples as disclosed herein. In some examples, aspects of the operations of 1410 may be performed by a UE communication manager 1130 as described with reference to FIG. 11.

At 1415, the method may include monitoring for a transmission from the UE during the period of time based on the timer configuration. The operations of 1415 may be performed in accordance with examples as disclosed herein. In some examples, aspects of the operations of 1415 may be performed by a monitor transmission manager 1135 as described with reference to FIG. 11.

The following provides an overview of aspects of the present disclosure:

Aspect 1: A method for wireless communications at a UE, comprising: receiving, from a network entity, control signaling indicating a timer configuration for operation of a timer at the UE associated with a discontinuous transmission pattern at the network entity, wherein the control signaling further indicates that the network entity will operate in accordance with the discontinuous transmission pattern for a period of time, and wherein the discontinuous transmission pattern indicates that the network entity cycles between an active transmission mode and an inactive transmission mode during the period of time; communicating, with the network entity, a transmission that initiates the timer; and operating the timer during the period of time in accordance with the timer configuration.

Aspect 2: The method of aspect 1, wherein receiving the control signaling comprises: receiving a first control message indicating the timer configuration; and receiving a second control message indicating that the network entity will operate in accordance with the discontinuous transmission pattern for the period of time.

Aspect 3: The method of any of aspects 1 through 2, wherein operating the timer in accordance with the timer configuration comprises: stopping the timer based at least in part on the network entity entering the inactive transmission mode in accordance with the discontinuous transmission pattern; and resetting the timer based at least in part on the network entity entering the active transmission mode in accordance with the discontinuous transmission pattern.

Aspect 4: The method of any of aspects 1 through 3, wherein operating the timer in accordance with the timer configuration comprises: pausing the timer based at least in part on the network entity entering the inactive transmission mode in accordance with the discontinuous transmission pattern; and resuming the timer based at least in part on the network entity entering the active transmission mode in accordance with the discontinuous transmission pattern.

Aspect 5: The method of any of aspects 1 through 4, wherein operating the timer in accordance with the timer configuration comprises: operating the timer using a second value for the timer different than a first value for the timer associated with the active transmission mode, the second value indicated in the timer configuration.

Aspect 6: The method of any of aspects 1 through 5, wherein operating the timer in accordance with the timer configuration comprises: implementing the timer configuration based at least in part on the network entity being in the inactive transmission mode for at least a threshold duration of a timer duration of the timer.

Aspect 7: The method of any of aspects 1 through 6, further comprising: communicating, with the network entity, a second transmission that initiates a second timer; and running the second timer in accordance with the timer configuration.

Aspect 8: The method of aspect 7, wherein the timer configuration indicates a first configuration for the timer and a second configuration for the second timer.

Aspect 9: The method of any of aspects 1 through 8, further comprising: communicating a second transmission with the network entity based on an expiration of the timer in accordance with the timer configuration.

Aspect 10: A method for wireless communications at a network entity, comprising: transmitting, to a UE, control signaling indicating a timer configuration for operation of a timer at the UE associated with a discontinuous transmission pattern at the network entity, wherein the control signaling further indicates that the network entity will operate in accordance with the discontinuous transmission pattern for a period of time, and wherein the discontinuous transmission pattern indicates that the network entity cycles between an active transmission mode and an inactive transmission mode during the period of time; communicating, with the UE, a transmission that initiates a timer at the UE; and monitoring for a transmission from the UE during the period of time based at least in part on the timer configuration.

Aspect 11: The method of aspect 10, further comprising: transmitting, to a second network entity, second control signaling indicating the timer configuration.

Aspect 12: The method of any of aspects 10 through 11, wherein transmitting the control signaling comprises: transmitting a first control message indicating the timer configuration; and transmitting a second control message indicating that the network entity will operate in accordance with the discontinuous transmission pattern for the period of time.

Aspect 13: The method of any of aspects 10 through 12, wherein transmitting the control signaling comprises: transmitting the control signaling indicating the timer configuration indicating for the UE to stop the timer based at least in part on the network entity entering the inactive transmission mode in accordance with the discontinuous transmission pattern and for the UE to reset the timer based at least in part on the network entity entering the active transmission mode in accordance with the discontinuous transmission pattern.

Aspect 14: The method of any of aspects 10 through 13, wherein transmitting the control signaling comprises: transmitting the control signaling indicating the timer configuration indicating for the UE to pause the timer based at least in part on the network entity entering the inactive transmission mode in accordance with the discontinuous transmission pattern and for the UE to resume the timer based at least in part on the network entity entering the active transmission mode in accordance with the discontinuous transmission pattern.

Aspect 15: The method of any of aspects 10 through 14, wherein transmitting the control signaling comprises: transmitting the control signaling indicating the timer configuration indicating for the UE to use a second value for the timer different than a first value for the timer associated with the active transmission mode of the network entity, the second value indicated in the timer configuration.

Aspect 16: The method of any of aspects 10 through 15, wherein operating the timer in accordance with the timer configuration comprises: transmitting the control signaling indicating the timer configuration indicating for the UE to implement the timer configuration based at least in part on the network entity being in the inactive transmission mode for at least a threshold duration of a timer duration of the timer.

Aspect 17: The method of any of aspects 10 through 16, further comprising: communicating, with the UE, a transmission that initiates a second timer at the UE in accordance with the timer configuration, wherein monitoring for the transmission comprises monitoring for the transmission based at least in part on the timer, the second timer, and the timer configuration.

Aspect 18: The method of aspect 17, wherein the timer configuration indicates a first configuration for the timer and a second configuration for the second timer.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a network entity, comprising a processor; memory coupled with the processor; and instructions stored in the memory and executable by the processor to cause the apparatus to perform a method of any of aspects 10 through 18.

Aspect 23: An apparatus for wireless communications at a network entity, comprising at least one means for performing a method of any of aspects 10 through 18.

Aspect 24: A non-transitory computer-readable medium storing code for wireless communications at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

"As used herein, "satisfying a threshold" may, depending on the context, refer to a value being greater than the threshold, greater than or equal to the threshold, less than the threshold, less than or equal to the threshold, equal to the threshold, not equal to the threshold, or the like."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors;

one or more memories coupled with the one or more processors; and instructions stored in the one or more memories and executable by the one or more processors to cause the apparatus to:

receive, from a network entity, control signaling indicating a timer configuration for operation of a timer at the UE associated with a discontinuous transmission pattern at the network entity, wherein the control signaling further indicates that the network entity will operate in accordance with the discontinuous transmission pattern for a period of time, and wherein the discontinuous transmission pattern indicates that the network entity cycles between an active transmission mode and an inactive transmission mode during the period of time;

transmit, to the network entity, a transmission that initiates the timer; and operate the timer during the period of time in accordance with the timer configuration, wherein a duration of the timer is different from a duration of the inactive transmission mode during the period of time.

2. The apparatus of claim 1, wherein the instructions to receive the control signaling are executable by the one or more processors to cause the apparatus to:

receive a first control message indicating the timer configuration; and receive a second control message indicating that the network entity will operate in accordance with the discontinuous transmission pattern for the period of time.

3. The apparatus of claim 1, wherein the instructions to operate the timer in accordance with the timer configuration are executable by the one or more processors to cause the apparatus to:

stop the timer based at least in part on the network entity entering the inactive transmission mode in accordance with the discontinuous transmission pattern; and reset the timer based at least in part on the network entity entering the active transmission mode in accordance with the discontinuous transmission pattern.

4. The apparatus of claim 1, wherein the instructions to operate the timer in accordance with the timer configuration are executable by the one or more processors to cause the apparatus to:

pause the timer based at least in part on the network entity entering the inactive transmission mode in accordance with the discontinuous transmission pattern; and resume the timer based at least in part on the network entity entering the active transmission mode in accordance with the discontinuous transmission pattern.

5. The apparatus of claim 1, wherein the instructions to operate the timer in accordance with the timer configuration are executable by the one or more processors to cause the apparatus to:

operate the timer using a second value for the timer different than a first value for the timer associated with the active transmission mode, the second value indicated in the timer configuration.

6. The apparatus of claim 1, wherein the instructions to operate the timer in accordance with the timer configuration are executable by the one or more processors to cause the apparatus to:

implement the timer configuration based at least in part on the network entity being in the inactive transmission mode for at least a threshold duration of a timer duration of the timer.

7. The apparatus of claim 1, wherein the instructions are further executable by the one or more processors to cause the apparatus to:

communicate, with the network entity, a second transmission that initiates a second timer; and run the second timer in accordance with the timer configuration.

8. The apparatus of claim 7, wherein the timer configuration indicates a first configuration for the timer and a second configuration for the second timer.

9. The apparatus of claim 1, wherein the instructions are further executable by the one or more processors to cause the apparatus to:

communicate a second transmission with the network entity based on an expiration of the timer in accordance with the timer configuration.

10. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), control signaling indicating a timer configuration for operation of a timer at the UE associated with a discontinuous transmission pattern at the network entity, wherein the control signaling further indicates that the network entity will operate in accordance with the discontinuous transmission pattern for a period of time, and wherein the discontinuous transmission pattern indicates that the network entity cycles between an active transmission mode and an inactive transmission mode during the period of time;

receive, from the UE, a transmission that initiates a timer at the UE, wherein a duration of the timer is different from a duration of the inactive transmission mode during the period of time; and monitor for a transmission from the UE during the period of time based at least in part on the timer configuration.

11. The apparatus of claim 10, wherein the instructions are further executable by the one or more processors to cause the apparatus to:

transmit, to a second network entity, second control signaling indicating the timer configuration.

12. The apparatus of claim 10, wherein the instructions to transmit the control signaling are executable by the one or more processors to cause the apparatus to:

transmit a first control message indicating the timer configuration; and transmit a second control message indicating that the network entity will operate in accordance with the discontinuous transmission pattern for the period of time.

13. The apparatus of claim 10, wherein the instructions to transmit the control signaling are executable by the one or more processors to cause the apparatus to:

transmit the control signaling indicating the timer configuration indicating for the UE to stop the timer based at least in part on the network entity entering the inactive transmission mode in accordance with the discontinuous transmission pattern and for the UE to reset the timer based at least in part on the network entity entering the active transmission mode in accordance with the discontinuous transmission pattern.

14. The apparatus of claim 10, wherein the instructions to transmit the control signaling are executable by the one or more processors to cause the apparatus to:

transmit the control signaling indicating the timer configuration indicating for the UE to pause the timer based at least in part on the network entity entering the inactive transmission mode in accordance with the discontinuous transmission pattern and for the UE to resume the timer based at least in part on the network entity entering the active transmission mode in accordance with the discontinuous transmission pattern.

15. The apparatus of claim 10, wherein the instructions to transmit the control signaling are executable by the one or more processors to cause the apparatus to:

transmit the control signaling indicating the timer configuration indicating for the UE to use a second value for the timer different than a first value for the timer associated with the active transmission mode of the network entity, the second value indicated in the timer configuration.

16. The apparatus of claim 10, wherein the instructions to operate the timer in accordance with the timer configuration are executable by the one or more processors to cause the apparatus to:

transmit the control signaling indicating the timer configuration indicating for the UE to implement the timer configuration based at least in part on the network entity being in the inactive transmission mode for at least a threshold duration of a timer duration of the timer.

17. The apparatus of claim 10, wherein the instructions are further executable by the one or more processors to cause the apparatus to:

communicating, with the UE, a transmission that initiates a second timer at the UE in accordance with the timer configuration, wherein monitoring for the transmission comprises monitoring for the transmission based at least in part on the timer, the second timer, and the timer configuration.

18. The apparatus of claim 17, wherein the timer configuration indicates a first configuration for the timer and a second configuration for the second timer.

19. A method for wireless communications at a user equipment (UE), comprising:

receiving, from a network entity, control signaling indicating a timer configuration for operation of a timer at the UE associated with a discontinuous transmission pattern at the network entity, wherein the control signaling further indicates that the network entity will operate in accordance with the discontinuous transmission pattern for a period of time, and wherein the discontinuous transmission pattern indicates that the network entity cycles between an active transmission mode and an inactive transmission mode during the period of time;

transmitting, to the network entity, a transmission that initiates the timer; and operating the timer during the period of time in accordance with the timer configuration, wherein a duration of the timer is different from a duration of the inactive transmission mode during the period of time.

20. The method of claim 19, wherein receiving the control signaling comprises:

receiving a first control message indicating the timer configuration; and receiving a second control message indicating that the network entity will operate in accordance with the discontinuous transmission pattern for the period of time.

* * * * *